United States Patent
Pieno et al.

(10) Patent No.: US 12,050,696 B2
(45) Date of Patent: *Jul. 30, 2024

(54) AGENT-BASED VULNERABILITY MANAGEMENT

(71) Applicant: TRIPWIRE, INC., Portland, OR (US)

(72) Inventors: Mark Pieno, Tualatin, OR (US); Tyler Reguly, Toronto (CA); Darlene Hibbs, London (CA); Craig Young, Alpharetta, GA (US); Lane Thames, Atlanta, GA (US); Jamaal Scarlett, Alpharetta, GA (US); Lamar Bailey, Cumming, GA (US); Miles Budnek, Alpharetta, GA (US); Bob Terhune, Portland, OR (US); Jon Loucks, Tualatin, OR (US)

(73) Assignee: TRIPWIRE, INC., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/186,688

(22) Filed: Mar. 20, 2023

(65) Prior Publication Data

US 2023/0229788 A1 Jul. 20, 2023

Related U.S. Application Data

(63) Continuation of application No. 16/895,928, filed on Jun. 8, 2020, now abandoned.

(Continued)

(51) Int. Cl.
*H04L 9/40* (2022.01)
*G06F 9/445* (2018.01)
(Continued)

(52) U.S. Cl.
CPC ........ *G06F 21/577* (2013.01); *G06F 9/44505* (2013.01); *G06F 16/24552* (2019.01); *G06F 2221/034* (2013.01)

(58) Field of Classification Search
CPC ............ G06F 21/577; G06F 16/24552; G06F 9/44505; G06F 2221/034
(Continued)

(56) References Cited

U.S. PATENT DOCUMENTS 7,243,348 B2 7/2007 Good et al.
7,316,016 B2 1/2008 Difalco
(Continued)

*Primary Examiner* — Anthony D Brown
(74) *Attorney, Agent, or Firm* — Fredrikson & Byron, P.A.

(57) ABSTRACT

Apparatus and methods for analyzing vulnerabilities with an agent executing on a computer host using a vulnerability scanner and vulnerability server are disclosed. In one example a method comprises, with a vulnerability scanner, searching for data associated with a vulnerability test (for example, the command that initiates the test) to determine whether the data associated with the vulnerability is available or not available. When the data associated with the vulnerability test is available in a vulnerability scanner database, the vulnerability scanner provides prior scan results generated using one or more commands specified by the data to a vulnerability aggregation server. When the data associated with the vulnerability test is not available in the vulnerability scanner database, the vulnerability scanner performs a scan of the host to obtain results associated with the vulnerability test.

20 Claims, 15 Drawing Sheets

Related U.S. Application Data

(60) Provisional application No. 62/858,662, filed on Jun. 7, 2019.

(51) Int. Cl.
*G06F 16/2455* (2019.01)
*G06F 21/57* (2013.01)

(58) Field of Classification Search
USPC .......................................................... 726/25
See application file for complete search history.

(56) References Cited

U.S. PATENT DOCUMENTS

| | | |
|---|---|---|
| 7,360,099 B2 | 4/2008 | Difalco et al. |
| 7,587,754 B2 | 9/2009 | Difalco et al. |
| 7,620,715 B2 | 11/2009 | Difalco et al. |
| 7,765,460 B2 | 7/2010 | Difalco et al. |
| 7,822,724 B2 | 10/2010 | Difalco et al. |
| 8,140,635 B2 | 3/2012 | Difalco |
| 8,176,158 B2 | 5/2012 | Difalco et al. |
| 8,819,491 B2 | 8/2014 | Whitlock et al. |
| 9,634,951 B1 | 4/2017 | Hunt et al. |
| 9,741,017 B2 | 8/2017 | Good et al. |
| 9,766,873 B2 | 9/2017 | Steigleder |
| 10,158,660 B1 | 12/2018 | Reguly et al. |
| 10,313,257 B1 | 6/2019 | Hunt et al. |
| 10,318,894 B2 | 6/2019 | Difalco et al. |
| 10,382,486 B2 | 8/2019 | Rivers |
| 2002/0196330 A1 | 12/2002 | Park et al. |
| 2004/0024843 A1 | 2/2004 | Smith |
| 2004/0075738 A1 | 4/2004 | Burke et al. |
| 2004/0122962 A1 | 6/2004 | Difalco et al. |
| 2006/0206883 A1 | 9/2006 | Sabbouh |
| 2006/0242277 A1 | 10/2006 | Torrence et al. |
| 2007/0016960 A1* | 1/2007 | Glaser .................. H04L 63/168 726/4 |
| 2007/0124255 A1 | 5/2007 | Difalco et al. |
| 2007/0239862 A1 | 10/2007 | Bronez et al. |
| 2008/0016501 A1 | 1/2008 | Muhlestein et al. |
| 2008/0021912 A1 | 1/2008 | Seligman et al. |
| 2008/0168420 A1 | 7/2008 | Sabbouh |
| 2010/0005107 A1 | 1/2010 | Difalco |
| 2010/0043066 A1 | 2/2010 | Miliefsky |
| 2011/0066951 A1 | 3/2011 | Ward-Karet et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0208841 A1 | 8/2011 | Robertson et al. |
| 2012/0023076 A1 | 1/2012 | Torrence et al. |
| 2012/0179805 A1 | 7/2012 | Difalco |
| 2012/0210434 A1* | 8/2012 | Curtis ................. H04L 63/0263 726/25 |
| 2017/0244622 A1* | 8/2017 | Salgueiro ............... H04L 43/50 |
| 2017/0271027 A1* | 9/2017 | Childs .................. G06F 21/577 |

* cited by examiner

AGENT-BASED VULNERABILITY MANAGEMENT

CROSS-REFERENCE TO RELATED APPLICATIONS

This application is a continuation of U.S. patent application Ser. No. 16/895,928, filed Jun. 8, 2020, which claims the benefit of U.S. Provisional Application No. 62/858,662, filed Jun. 7, 2019, each of which is incorporated herein by reference in its entirety.

BACKGROUND

Existing compliance and security systems for enterprise environments employ the use of agents for monitoring system integrity and reporting changes to one or more centralized compliance servers. However, existing agents are limited in a number of ways. Known examples of compliance agents are implemented as a monolithic Java agent that must be connected to a server almost continuously. Further, existing agents do not allow for plugins, quarantine, prioritizing of messaging, or disconnected operation. Accordingly, there is ample opportunity for improvement in the implementation of agents for monitoring system integrity and reporting changes.

SUMMARY

Apparatus and methods for agent-based vulnerability management (ABVM) are disclosed for generating, sending, and receiving messages in a networked environment using autonomous (or semi-autonomous) agents.

The disclosed agent platforms are designed to address challenges presented in enterprise deployments of agents by, for example: reducing agent footprint, improving scalability, dealing with erratic computer networks, providing semi-autonomous operation, enhancing enterprise security, or providing a self-correcting framework. Practical applications of certain examples of the disclosed technology include performing operations relating to vulnerabilities, for example, identifying vulnerabilities (e.g., by scanning computer assets using agents), remediating vulnerabilities (e.g., by generating configuration changes to mitigate or eliminate identified vulnerabilities), report generation (e.g., providing a risk score used to assess a degree of vulnerability in one or more computing assets in an environment), and using these vulnerability operations for file integrity management (FIM), security configuration management (SCM), real-time detection, logging, and/or reporting of threats or anomalies, vulnerability and/or risk scoring, and policy compliance.

A system of one or more computers can be configured to perform disclosed operations by having computer-executable instructions, circuits, or other software, firmware, or hardware provided in the system that when in operation causes or cause the system to perform the disclosed operations. One general aspect of the disclosed technology includes a method of analyzing vulnerabilities with an agent, the method including: with a vulnerability scanner, searching for first data associated with a vulnerability test to determine whether the first data associated with the vulnerability is available or not available. The method of analyzing vulnerabilities also includes when the first data associated with the vulnerability test is available in a vulnerability scanner database, providing the first data to a vulnerability aggregation server. The method of analyzing vulnerabilities also includes when the first data associated with the vulnerability test is not available in the vulnerability scanner database, performing a scan of the host to obtain second data associated with the vulnerability test. Other aspects include corresponding computer systems, apparatus, and computer-executable instructions stored on one or more computer readable media that cause a processor to perform one or more of the disclosed methods.

Certain examples can include one or more of the following features: The method further including: with the vulnerability scanner, receiving first data from a host including data generated by performing a vulnerability test on the host with an agent and storing the first data in a vulnerability scanner database. The method further including: with the vulnerability scanner, sending the first data or the second data to a vulnerability aggregation server. The method where the first data includes an input command file. The method where the first data includes execution results generated by executing at least one command encoded within an Open Vulnerability Assessment Language (OVAL) file. The method further including performing the scan during a time period when the vulnerability server does not have an active network connection to the host. The method further including: sending a prequalifier indicator indicating a prequalifier conditional associated with the vulnerability test to the host. The method can also include with the host, comparing a configuration aspect of the host to the prequalifier conditional. In some examples, performing the scan is not performed unless the comparing indicates the configuration aspect is suitable for the prequalifier conditional. In some examples, the prequalifier conditional indicates an operating system, an operating system version, an application, or an application version installed on the host. In some examples, the method further includes searching for the data by using a description of the vulnerability test as a search key. In some examples, the method further includes performing the scan by executing operations specified by the search key. In some examples, the method further includes providing the search key to the agent for executing the search key. According to another aspect, examples can include corresponding computer systems, apparatus, and computer-executable instructions stored on one or more computer readable media that cause a processor to perform one or more of the disclosed methods.

One general aspect of the disclosed technology includes computer-readable storage media storing computer-executable instructions, which when executed, cause a computer to perform a method, the instructions including: instructions that cause the computer to invoke a database search for first data associated with a vulnerability test to determine whether the first data precludes scanning a host. The computer-readable storage media also includes instructions for, when the first data associated with the vulnerability test is available in a vulnerability scanner database, providing the first data to a vulnerability aggregation server. The computer-readable storage media also includes instruction for, when the first data associated with the vulnerability test is not available in the vulnerability scanner database, performing a scan of the host to obtain second data associated with the vulnerability test. Other aspects include corresponding computer systems, apparatus, and computer-executable instructions stored on one or more computer readable media that cause a processor to perform one or more of the disclosed methods.

Certain examples can include one or more of the following features: The computer-readable storage media where the first data includes a registry entry or signature. The computer-readable storage media where the first data includes a description of the vulnerability test including an instruction executed by the host as part of performing the scan. In some examples, the instructions further include: instructions that cause the computer to compare a prequalifier indicated in the first data or in the second data to a configuration aspect of the host. The computer-readable storage media can also include instructions for, based on the comparing, determining to perform the scan. In some examples, the first data or the second data include OVAL data. According to another aspect, examples can include corresponding computer systems, apparatus, and computer-executable instructions stored on one or more computer readable media that cause a processor to perform one or more of the disclosed methods.

In some examples, an apparatus includes at least one processor, memory, and any one or more computer-readable storage media disclosed herein.

Another general aspect of the disclosed technology includes a method that, with a host, executes at least one command specified by an input file. The method also includes with the host, sending results from the executing the at least one command to a vulnerability scanner to store the results in a cache at the vulnerability scanner as a key-value pair, where the at least one command is the key of the pair, and the results are the value of the pair. Other aspects include corresponding computer systems, apparatus, and computer-executable instructions stored on one or more computer readable media that cause a processor to perform one or more of the disclosed methods.

Certain examples can include one or more of the following features. The method further including, with the vulnerability scanner: searching for a result in the cache using a key. The method can also include when data associated with the key is not available or is determined to be invalid, causing the host to execute the at least one command. In some examples, the host executes the at least one command when the host does not have an active network connection to the vulnerability scanner. In some examples, the method further includes, with the vulnerability scanner, and responsive to receiving the results from the host: storing the results in the cache at the vulnerability scanner. The method can also include sending a prequalifier description to the host. The method can also include receiving from the host a description of the host. The method can also include based on the description, selecting the at least one command to be sent to the host. In some examples, the key specifies a vulnerability test expressed using OVAL. According to another aspect, examples can include corresponding computer systems, apparatus, and computer-executable instructions stored on one or more computer readable media that cause a processor to perform one or more of the disclosed methods.

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

DETAILED DESCRIPTION

I. General Considerations

Figure 1:
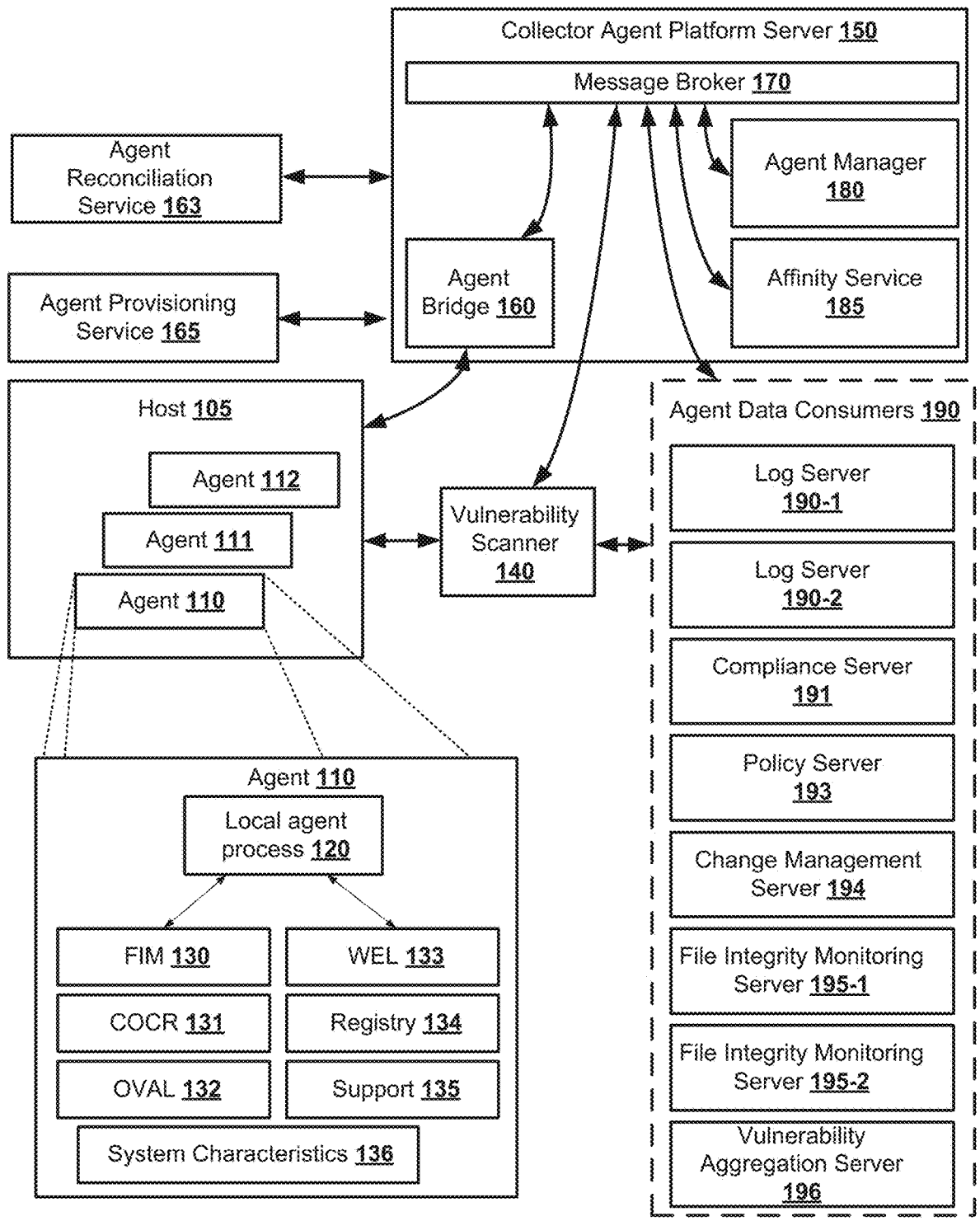
FIG. 1 illustrates an exemplary computing environment in which some examples of the disclosed technology can be implemented.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "vulnerability," "weakness," "scan," and "perform" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Example Computing Network Environment

FIG. 1 illustrates an exemplary computing environment 100 in which some examples of the disclosed technology can be implemented. A number of agents 110, 111, and 112 executing on a host 105 are illustrated in FIG. 1. As used herein, a "host" refers to a computing asset configure to execute at least one agent. One of the agents 110 is further detailed as shown, and includes a local agent process 120 that can manage and communicate with a number of plugins 130-135 (e.g., a file integrity monitoring (FIM) plugin 130, a command output capture rule (COCR) plugin 131, an Open Vulnerability Assessment Language (OVAL) plugin 132, a Windows event log (WEL) plugin 133, a Registry plugin 134, a support plugin 135 that are configured to extend the functionality of the agent. The OVAL plugin 132 generates a system characteristics file 136 stored at the agent host. Further details and examples of agents are discussed further below. As will be readily understood to one of ordinary skill in the relevant art, the agent technology disclosed in this paragraph is not limited to the functionality of agent plugins 130-135, but can be adapted to specific deployments by adding other plugins or removing the depicted plugins.

A vulnerability scanner 140 is used to scan the host that is hosting the agents. The agents can also send data to the vulnerability scanner that is generated by executing commands previously, such as when the host is off-line or otherwise not available. These results can be stored in a database or cache at the vulnerability scanner 140 and used to assess vulnerabilities on the host. Thus, by not requiring real-time access to the host 105 hosting the agents, system performance can be improved by allowing for cache results to be used. A person of ordinary skill in the relevant art having the benefit of the present disclosure could adapt existing commercial vulnerabilities, for example, a Tripwire® Device Profiler appliance, for implement technologies disclosed herein.

Each of the agents 110-112 communicates with the rest of the system depicted in the computing environment 100 via a vulnerability scanner agent platform server 150. As shown, the vulnerability scanner agent platform server 150 includes an agent bridge 160 for sending messages to and from agents (e.g., agents 110-112). The agent bridge 160 can send messages over a computer network to agents executing on other computers, using inter-process and/or inter-thread communication to agents executing on the same computer as the communication bridge, or by using other suitable communication means.

An agent reconciliation service 163 can be used to match previous agent identifiers and operating system information with current identifiers and current operating system information. This reconciliation service ensures continuity in data and logging information stored in the agent data consumers 190.

An agent provisioning service 165 can be used that informs agents about their initial configuration information, configures the agents with specific combinations of plugins, or provides an upgrade of agent or plugin executable code. The agent provisioning service 165 can send discovery and configuration templates to the agents for execution and configuration of the respective receiving agent.

The illustrated vulnerability scanner agent platform server 150 also includes a message broker 170 with multiple message queues for temporarily storing messages received from and sent to, for example, the agent bridge 160, an agent manager 180, an affinity service 185, and agent data consumers 190. In some examples, the message broker 170 has a single message queue. The vulnerability scanner agent platform server 150 coordinates operation of the agents by sending and receiving messages using the message broker 170.

Some vulnerability scanner agent platform server implementations can contain more than one message broker 170 organized as a network of message brokers. Additionally, some implementations can include additional instances of the agent bridge 160 or the agent manager 180. Various combinations of message brokers, agent bridges, and agent managers can be used to support high-availability and redundant capabilities.

As shown in FIG. 1, the affinity service 185 resides as a component of the vulnerability scanner agent platform server 150 (e.g., as a standalone process executing on the vulnerability scanner agent platform server 150), while in other examples, the affinity service is hosted in an alternate location (e.g., as a thread or other component of the agent manager 180).

In some examples of the disclosed technology, for example, in large networks with multiple vulnerability scanner agent platform servers 150 and multiple agent data consumers 190, the affinity service 185 would be external to the vulnerability scanner agent platform server and centralized to improve communications with all instances of the vulnerability scanner agent platform server and destination agent data consumers.

The exemplary computing environment 100 includes a number of destination agent data consumers 190, including, but not limited to, multiple log servers (190-1 and 190-2), a compliance server 191, a policy server 193, a change management server 194, multiple file integrity monitoring (FIM) servers (195-1 and 195-2), and a vulnerability aggregations server 196. In some examples the multiple log servers and/or the multiple FIM servers are hosted on separate virtual machines on the same physical hardware (e.g., a computing server). In some examples, the multiple log servers and/or the multiple FIM servers are hosted on separate physical machines in the same computer network environment. In some examples, multiple log servers and/or the multiple FIM servers are hosted on separate physical machines in different computing environments.

The affinity service 185 provides mappings to the message broker 170 and/or agent bridge 160 in order to direct message flow from the agents (e.g., agents 110-112) to one of the multiple log servers and/or multiple FIM servers. The affinity service 185 can utilize universally unique identifiers (UUIDs) in order to identify the agents 110-112 and destination agent data consumers 190.

In some examples, the affinity service 185 maintains a table representing the associations between agents (e.g. agents 110-112) and one or more of the destination agent data consumers 190). The agents can be assigned using a number of methodologies, including but not limited to assignments based on: round robin, load and/or capacity of one or more of the destination agent data consumers 190, geographic location of the agents and/or the destination agent data consumers, network topology (e.g., by physical subnets or virtual local area network (VLAN), function roles (e.g., a respective consumer and/or agent is deployed for product development, testing, staging, or production), version of an agent, and/or version of a destination agent data consumer.

In some examples, the affinity service 185 directs routing of messages from agents by intercepting an agent online message emitted by the agent manager 180. The agent online message is enhanced by providing the product server UUID assigned to the agent by the affinity service 185.

In some examples, the affinity service 185 maintains an affinity map that defines relationships between agents and destination agent data consumers. In some examples, the affinity service is configured to map each of the agents to a respective one of the data consumers. In some examples, the affinity service mapping is based at least in part on one or more of the following: a geographic location of one or more of the agents and/or the destination agent data consumers; topology of a network carrying communication between the destination agent data consumers, vulnerability scanner agent platform servers, and/or agent computing hosts; a functional role of one of the agents and/or one of the destination agent data consumers; a version of an agent; and/or a version of a destination agent data consumer.

Different combinations of destination agent data consumers 190 can be deployed in the environment 100 according to the desired compliance and security applications to be performed. These combinations are not limited to a single machine. The agent bridge 160, message broker 170, agent manager 180, or any combination of the destination agent data consumers can execute on separate computers, or separate virtual machines on a single or multiple computers. For example, the compliance server 191 can host a Compliance and Configuration Control (CCC) tool used to detect, analyze, and report on change activity in an IT infrastructure. The CCC tool can assess or receive configurations of the one or more assets at one or more locations and determine whether the assets comply with internal and external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The CCC tool can identify and validate changes to ensure these configurations remain in known and trusted states.

In particular implementations, the CCC tool operates by capturing a baseline of server file systems, desktop file system, directory servers, databases, virtual systems, middleware applications, and/or network device configurations in a known good state. Ongoing integrity checks then compare the current states against these baselines to detect changes. The CCC tool collects information used to reconcile changes detected by the agents 110-112, ensuring they are authorized and intended changes. The CCC tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the CCC tool to automatically recognize desired changes and expose undesired changes.

The CCC tool can also generate one or more reports concerning the monitored assets showing a wide variety of information (e.g., compliance information, configuration information, usage information, etc.) The compliance-related reports generated by the CCC tool can, in some instances, comprise a score for an asset that indicates the relative compliance status of the asset as a numerical value in a range of possible values (e.g., a score of 1 to 100 or other such numeric or alphabetical range). The CCC tool can also apply a set of one or more tests to the assets to evaluate the compliance status of one or more assets. In such embodiments, the compliance-related reports generated by the CCC tool can include the number of devices that passed a particular test as well as the number of devices that failed the test. Further, the CCC tool can store detected change event data in an event log or transmit the event data as soon as it is detected or shortly after it is detected. Event logs typically comprise a list of activities and configuration changes at assets of the IT network.

An exemplary CCC tool that is suitable for use with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT assets using other compliance and configuration control tools as well.

The compliance server 191 can also include a security information and event management (SIEM) tool that is used to centralize the storage and interpretation of events, logs, or compliance reports observed and generated in an IT management infrastructure. The event, log, and compliance report information is typically produced by other software running in the IT network. For example, CCC tools generate events that are typically kept in event logs or stored in compliance reports, as discussed above. The SIEM can be used to provide a consistent central interface that an IT administrator can use to more efficiently monitor and manage activity and configuration changes in an IT network. As needed, the IT administrator can access and use the CCC tool, which may provide deeper information than that provided by the SIEM. A SIEM tool can also integrate with external remediation, ticketing, and/or workflow tools to assist with the process of incident resolution. Furthermore, certain SIEMs include functionality for generating reports that help satisfy regulatory requirements (e.g., Sarbanes-Oxley, PCI-DSS, GLBA, or any other such requirement or standard such as any of those listed above). For these reasons, SIEM tools are becoming more widely adopted by IT administrators who desire to use a single, centralized interface for monitoring and managing their increasingly complex IT infrastructures.

Logging tools can operate similarly to SIEM tools. Accordingly, for any of the embodiments disclosed below, a logging tool may take the place of a SIEM tool. For ease of readability, however, reference will typically be made to just a SIEM tool. An exemplary tool for logging and SIEM that is suitable for use with the disclosed technology is the Tripwire® Log Center tool available from Tripwire, Inc.

III. Example Agent Implementation

Figure 2:
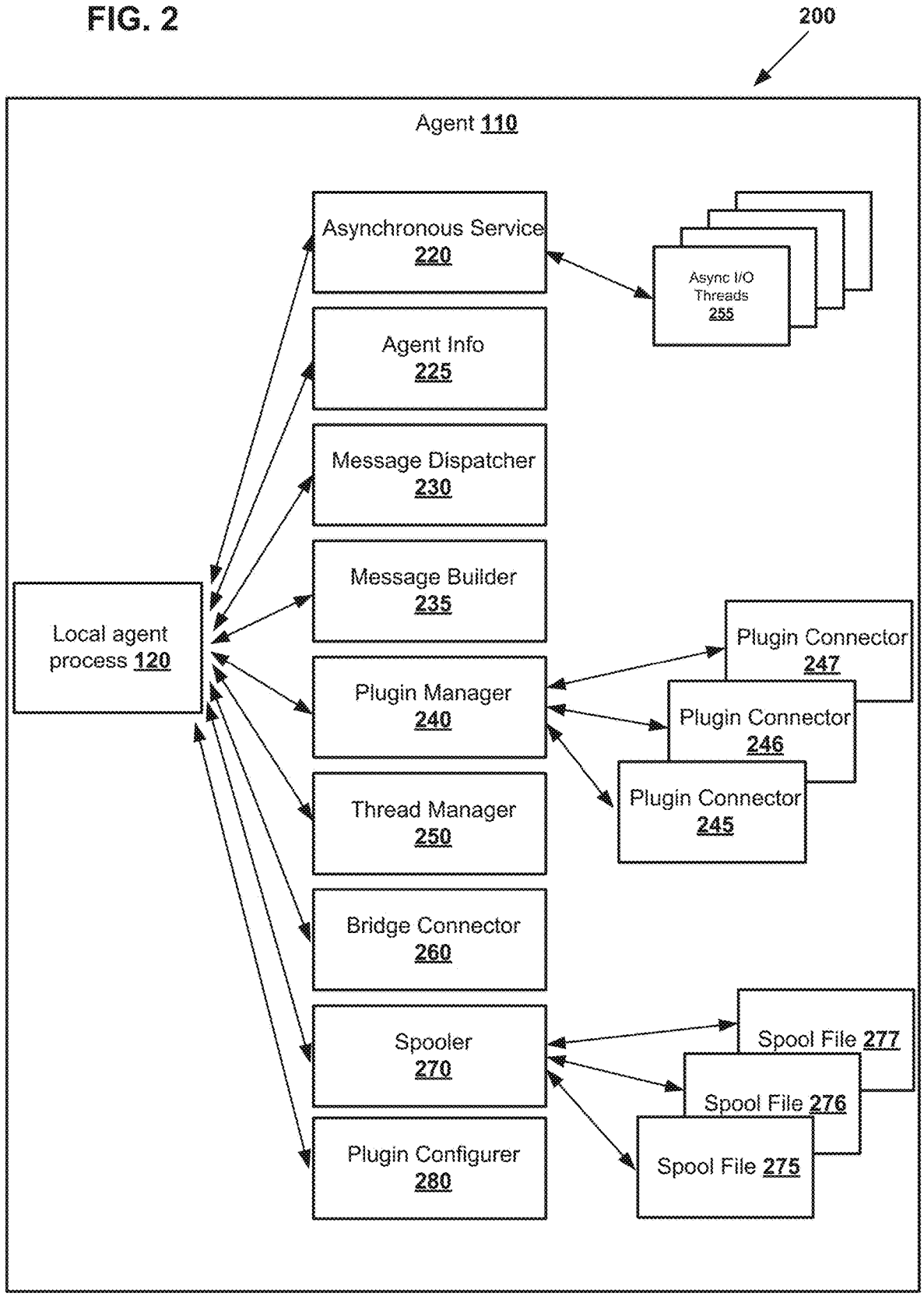
FIG. 2 is a block diagram further detailing an exemplary agent.

FIG. 2 is a block diagram 200 further detailing the exemplary agent 110 introduced above regarding FIG. 1. As shown in FIG. 2, the agent 110 includes one or more local agent processes 120 that interact with a number of different components (e.g., components 220, 225, 230, 235, 240, 250, 260, 270, and 280) to perform various agent functionalities. It should be readily understood to one of ordinary skill in the art that other examples of agents can include or omit some of the components illustrated in FIG. 2.

In some examples of the disclosed technology, the agent 110 provides a common platform for executing pluggable platform and/or native code in a manner that does not require a concurrently active connection to either the agent bridge 160 or destination agent data consumers 190. By allowing unconnected operation, the agent 110 is better able to tolerate intermittent network connections, delays, and/or errors in the vulnerability scanner agent platform server 150, destination agent data consumers 190, or interconnecting networks.

The agent 110 includes functionality for automatically adjusting the rate at which data on the host system is acquired based on, for example, currently-available host system resources including cache resources, host system workload, or other host system resources. In some examples, cached data can be resequenced based on priority changes and observed behavior of the host system. In some examples, the agent can automatically adjust and prioritize transmission of cached data to the agent bridge 160, based on, for example, the amount of time the agent has been connected to the network, a network reconnection event, and/or using a pseudorandom number to determine when to send cached data to the agent bridge. In some examples, the adjusted rate is based on the amount of lag between messages in a spool (e.g., spooler lag can be defined by an agent as the amount of time between the oldest and newest unsent messages in a spool). In some examples, certain messages can be prioritized over others (e.g., messages carrying Security Content Automation Protocol (SCAP) data can be prioritized so that they are sent with higher priority than other types of messages).

In some examples of the disclosed technology, the agent 110 is implemented in a microkernel-based operating system platform, while in other examples, the agent is implemented using a more traditional monolithic kernel. The agent can include an embedded scheduler (e.g., executed by the local agent process 120 or another process) that determines when to execute agent tasks, even when the agent is not connected to a bridge or server.

In some examples, the agent 110 is a container-based agent that implements Federal Information Processing Standard (FIPS) cryptographic services for communicating and/or storing data. In some examples, information regarding FIPS containers, names, or other relevant FIPS fields are removed from data (e.g., before transmitting or storing FIPS data) to increase the difficulty of unauthorized decryption of FIPS communications and stored data.

In some examples, the agent 110 includes autonomous configuration capabilities. For example, the agent 110 can determine software versions and installed hardware associated with its host system or with installed plugins and based on the determined software and hardware, negotiate a more detailed configuration with any of the destination agent data consumers 190.

In some examples, the agent 110 includes support for on-demand push down of plugin modules. In some examples, the agent 110 includes the capability to automatically switch to different pre-designated endpoints by automatically switching to particular ports and/or bridges.

In some examples, the compliance server 191 communicates a desired spool depth to agents, which in turn adjust the rate at which data is sent to server. In some examples, when a spool associated with an agent becomes completely full, the agent can insert a mark in the spool and then, once space in the spool becomes available, peel off logs when data transmission resumes.

As shown in FIG. 2, the agent 110 includes an asynchronous service module 220 for controlling and coordinating asynchronous services, for example, processing of asynchronous messages received from and sent to the agent bridge. The asynchronous service module 220 can employ a number of asynchronous input/output (I/O) threads 255 for performing these tasks.

An agent information module 225 is used to send messages with information about the agent and its associated plugins, including identification information (e.g., one or more UUIDs), catalogs of available messages the agent is capable of consuming or producing, and other agent information.

A message dispatcher 230 sends messages between an agent bridge (e.g., via a bridge connector) and agent plugins. In some examples, the message dispatcher 230 can send commands to an agent spooler. A message builder 235 is used to build messages sent by the message dispatcher, including envelopes for such messages.

A plugin manager 240 including a number of plugin connectors 245-247 for connecting the agent to its plugins. A thread manager 250 is used to manage agent threads (e.g., bridge writer threads, plugin manager threads, asynchronous I/O threads, or other agent threads).

A bridge connector 260 is used to connect to one or more agent bridges and send messages from, for example, the message builder.

A multi-file spooler 270 includes multiple spool files 275-277 that can store data from the plugin manager before the data is sent to, for example, one or more of the agent bridges.

A plugin configurer 280 can be used to configure agent plugins according to a received configuration template. The configuration template describes data to be gathered by the agent, frequency with which to gather the data, and formats to be used for generating augmentation and tag data generated by the plugin for sending to a vulnerability scanner.

In some examples of the disclosed technology, agents are designed to provide multi-platform functionality, thus allowing developers to develop agents for, e.g., both Windows and Posix platforms concurrently.

In some examples, agents and their corresponding plugins are written in C++ using multi-platform libraries and coding methodologies. In some examples, using languages such as C++ allows for a smaller agent memory footprint than agents implemented using other languages, e.g., Java.

In some examples, one or more agents (e.g., agents 110-112), agent bridges (e.g., agent bridge 160), and/or destination agent data consumers 190 (e.g., compliance server 191) can be co-located on the same computer system. In other examples, each of the agents, agent bridges, and compliance servers are installed on separate computing systems that are connected using a network or other communication means, or are installed within separate virtual machines connected on a single computing system.

In some examples of the disclosed technology, the agent is executed as a non-root/non-administrator user. This provides additional security by restricting access, but in some deployments, it may be desirable to allow limited administrator access to the agent and/or a subset of agent plugins to, for example, allow access to administrator resources (e.g., to access the Windows Event Log (WEL)).

The agents can communicate to the bridge using, for example, a proxy provided that supports the SOCKS5 protocol, although other protocols can be employed. In some examples, it is desirable to utilize authentication features provided by the network protocol to limit access to, for example, the bridge and/or compliance server to authenticated agents. In some examples, the SOCKS5 proxy used can be previously installed by a system administrator, and be used to support other communications unrelated to agent traffic. One desirable aspect of not including a proxy server within an agent is that the attack surface of the agent is reduced, as there is no open SOCKS5 port for attackers to attempt to attack.

A number of different aspects can be realized by using agent-based vulnerability management according the certain examples of the disclosed technology. For example, by using a credentialed agent on the host, bottlenecks created by performing external credentialed scans can be avoided. As another aspect, the use of agent-based vulnerability management allows for distribution of agents with machine images for deployment in cloud environments, thereby providing vulnerability assessment from the initiation of a new virtual machine instance. As another aspect, agent-based vulnerability management can be used to provide event-based scanning for vulnerabilities, for example triggered by configuration or file system changes detected on the agent's host. As another aspect, the use of network resources to discover and assess vulnerability state of associated hosts can be reduced. For example, vulnerability assessment data can be collected by the agent and then reported at a later point in time. As another aspect, agent-based vulnerability management improves the use of hosts at dynamic network addresses as the agents can provide the host with a universally-unique identifier (UUID) used to identify the host. As another aspect, devices that may be intermittently connected to a network can be scanned by the agent at any time the host is active, and results of vulnerability assessment can be provided at a later point in time, when the host becomes connected to the network and able to communicate with the vulnerability scanner.

In some examples, the spooler 270 is supplemented by a parallel Last-In First-Out buffer (LIFO) for certain types of messages. For example, because consumers of SCAP information often prioritize the most recent data available over older data, the agent can use a LIFO as a second spool for data coming from, e.g., an OVAL plugin, such that the newest messages are transmitted to the server first.

IV. Example Data Collection and Transmission System

Figure 3:
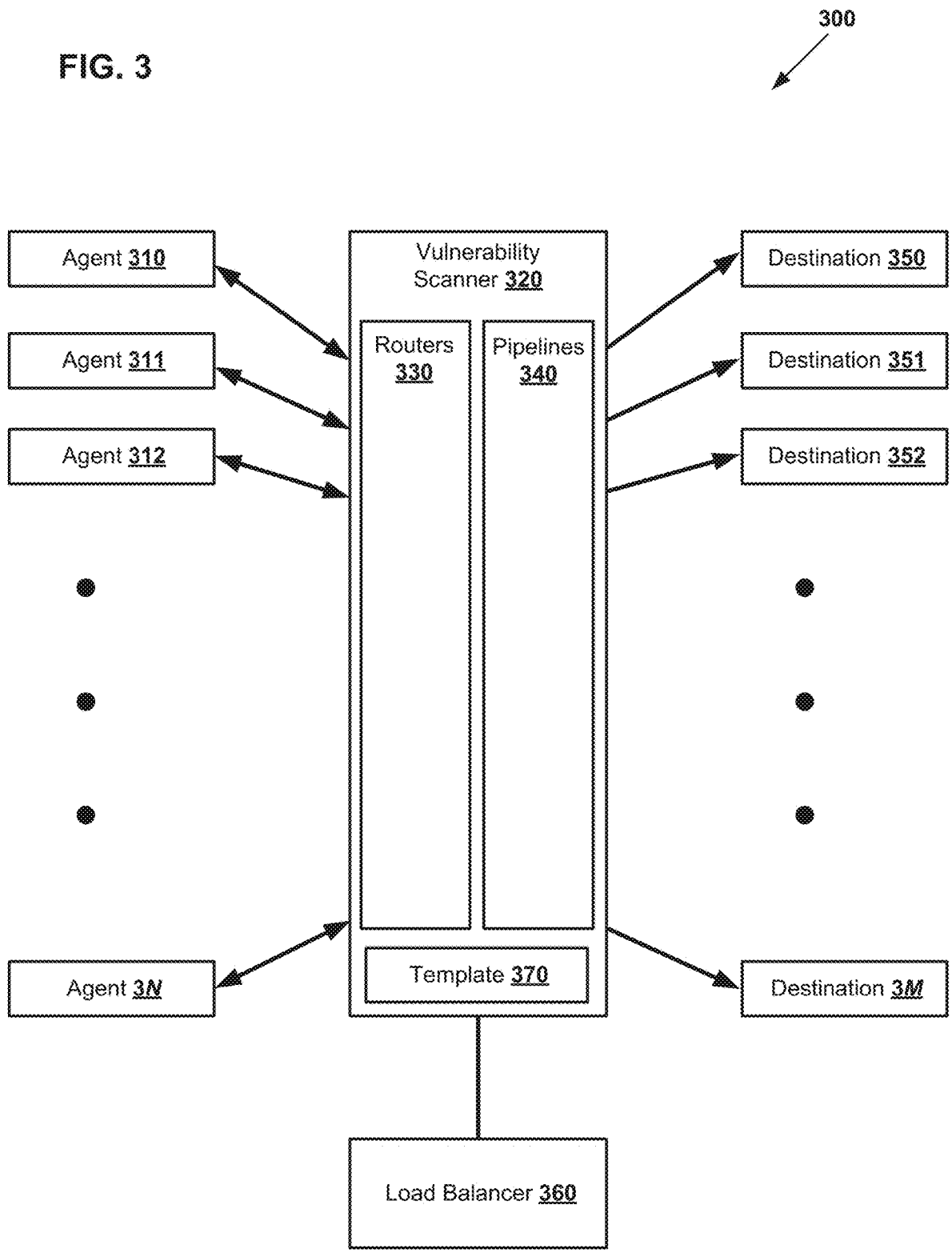
FIG. 3 depicts an example system in which a plurality of computing agents can send data to a vulnerability scanner, which in turn sends the data to a plurality of destinations.

FIG. 3 depicts an example system 300 in which a plurality of computing agents can send data to a vulnerability scanner, which in turn sends the data to a plurality of destinations. In some examples, the agent framework discussed above regarding FIG. 1 including details disclosed for the agent 110 further detailed in FIG. 2 can be employed, although as will be readily understood to one of ordinary skill in the relevant art, other suitable platforms can be used.

As shown in FIG. 3, a plurality of agents 310, 311, 312, etc. are configured to gather data describing operational aspects of their respective computing hosts and send the data to vulnerability scanner 320. The vulnerability scanner can be implemented using one or more computing devices and associated network devices. The depicted vulnerability scanner 320 includes a number of routers 330 that receive data from the agents and send the data to an appropriate one of the pipelines 340. The pipeline 340 enhanced the received data by applying stage selector rules to the received data and sending the resulting enhanced data to one or more destination agent data consumers, for example destinations 350, 351, and/or 352. One or more of the destinations can be a vulnerability scanner, as disclosed in further detail herein. The stage selector rules can include rules for sending data to a destination indicated by stage selector rule or sending data to a destination indicated by an affinity service. In some examples, the stage selector rules include rules for transforming the data prior to sending the data to one or more of the destinations. Also shown in FIG. 3 is a load balancer 360 which operates to monitor network traffic and loads and can be used to provide signals that are used by the vulnerability scanner 320 to select an appropriate one or more of the destinations depending on current network conditions. In some examples, the vulnerability scanner 320 is further configured to receive log data from network devices (e.g., routers, firewalls, switches, etc.) that do not have agents executing on them, through the use of a log provisioning service provided by the network device.

The vulnerability scanner 320 is implemented with a computing system and can include one or more physical processors and memory implemented using any suitable computing hardware. For example, the computing system processor(s) can be implemented with general-purpose CPUs and/or specialized processors, such as graphics processing units (GPUs) or tensor processing units (TPUs); application-specific integrated circuits (ASICs), or programmable/reconfigurable logic, such as field programmable gate arrays (FPGAs) executing on any suitable commercially-available computer), or any suitable combination of such hardware. In some examples, the processor can be implemented as a virtual processor executing on a physical processor under control of a hypervisor. In some examples, the processor can be implemented using hardware or software emulation to execute at least some instructions formatted in a different instruction set architecture than the native instruction set of the host processor providing instruction emulation. The vulnerability scanner memory can include volatile memory (e.g., registers, static random access memory (SRAM), dynamic random access memory DRAM), non-volatile memory (e.g., read only memory (ROM), programmable read only memory (PROM), electrically erasable programmable memory (EEPROM), flash memory, etc.), or some combination of volatile and non-volatile memory types. The vulnerability scanner 320 can further include a network interface that interfaces the vulnerability scanner to a wired and/or wireless communications network. In a virtual host environment, the network interface can be a virtualized network connection provided by the virtual host.

The vulnerability scanner 320 can be further configured to initiate discovery services by sending discovery requests to one or more of the agents to gather data regarding resources and plug-ins available on each respective agent. A discovery script or other computer-executable instructions are executed by a respective agent and can send a report back to the vulnerability scanner or can configure the agent itself. For example, the discovery script can cause the agent to be configured to augment data that it collects to allow for routing by the vulnerability scanner. For example, the augmented data can allow the vulnerability scanner to forward data to one of the destinations using a stateless protocol, thereby reducing the amount of computation performed by the vulnerability scanner in order to determine a destination. The destination agent data consumers can include relational databases, non-relational databases, map-reduce computing clusters (e.g., Hadoop), or resilient distributed dataset clusters (e.g., Apache Spark). Examples of some methods that can be performed in conjunction with the pipelines 340 are discussed in further detail at FIG. 6 below.

The vulnerability scanner 320 can establish network connections to hosts and their agents using any suitable protocol, including unsecure network access protocols (e.g., file transport protocol (FTP) or Telnet), or desirably, secure network access protocols such as Secure Shell (SSH), Hypertext Transfer Protocol Secure (HTTPS), Transport Layer Security (TLS), or Virtual Private Networking (VPN).

Once a secure tunnel has been established, communication between the vulnerability scanner 320 can be bi-directional. Scripts or other programs can be executed on the host or by an agent on the host to gather data regarding vulnerabilities. In some examples, some vulnerability analysis is provided by external tests that are not executed by an agent (e.g., identifying to which ports a host is listening), while in other examples, vulnerability analysis is carried out solely by one or more agents executing on the host.

In some examples, the vulnerability scanner 320 is configured using a programmable template 370. The template 370 provides a way to create rules, and logic for implementing such rules in a programmable fashion, allowing for improved flexibility and vulnerability scanner performance. In some examples, the template 370 includes rules based on at least one or more types of information about the host machine, including: operating system, operating system version, hypervisor, hypervisor version, system patches, programs installed, and/or other information. The rules can configure the behavior of the routers 330 and/or pipeline 340 to direct messages from the agents according the types of information. In some examples, data messages from the agent include an indication of the host machine information. In other examples, the vulnerability scanner 320 discovers such information about the host machines and associates this information with agents and/or their associated plugins. Messages received from the agents are then cross-referenced to determine which rules to apply to configure the routers 330 and/or pipelines 340.

In some examples, the template rules include rules based on assigned information for agents themselves. For examples, certain agents can be tagged at deployment to associate the agent with certain groups of agents. The rules are used to configure the routers 330 and/or pipelines 340 to direct messages based on tags associated with the agent. Examples of types of data agents can be tagged include associated owners of the agent, associate vulnerability scanners, load balancing, allocated resources, and other suitable types. In examples, the agent tags can be used to scale the destination set for agent message traffic. In some examples, data associated with a particular tag can be distributed to a plurality of two or more destinations. In some examples, data associated with a particular tag is distributed to a particular destination, in a one-to-one mapping. In some examples, messages are assigned to destination sets based on the type of data being carried by the agent message.

In some examples, the vulnerability scanner 320 initiates a scan by profiling a range of network addresses (e.g., IP addresses) and identifying computing assets accessible on the network. The vulnerability scanner 320 can initiate a port scan, which can include testing one or more ports for a response, identifying protocols provided on particular port (e.g., port 80 provides http services), and identifying underlying application services and versions. When scanning of a device commences, vulnerabilities to check for can be selected based on protocols, ports, applications, services, or versions of applications or services provisioned on the host. Examples of data that can be analyzed to identify vulnerabilities include, but are not limited to: network traffic, registry key values, file versions, file contents, command output, access control list, and service interrogation data. For example, vulnerabilities associated with a particular version of Apache web server, SSH, or other application/service can be selected based on the identified version of the application. In some examples, vulnerabilities are identified on a present or not present basis. In other words, a binary score is provided for a given particular vulnerability. In some examples, a variable score from a number of possible values is determined for one or more vulnerabilities. A host score can be generated for a host based on a metric calculated from individual vulnerability scores. A number of different techniques can be used to calculate a host score, include a sum of scores, a weighted sum of scores (e.g., where certain vulnerability scores are multiplied by a weight based on the underlying vulnerability), a geometric sum, an average, mean, or media, or other suitable technique. Examples of suitable scoring systems include proprietary scoring systems, such as those provided by Tripwire®, and openly-available scoring systems, such as Common Vulnerability Scoring System (CVSS).

The vulnerability scanner 320 can generate a number of responses for detected vulnerabilities. For example, the vulnerability scanner can generate an alert or warning that is communicated to one or more of the agent data consumers 190 for reporting or reconciliation. One or more vulnerability scores can also be reported to the agent data consumers for reporting or reconciliation. One or more of the agent data consumers can mitigate the vulnerability by, for example, restricting access or authentication to the vulnerable host, changing configuration of the vulnerable host, installing or updating software to mitigate the vulnerability, or by taking other suitable mitigation actions.

V. Example System Including Host, Vulnerability Scanner, and VnE Server

Figure 4:
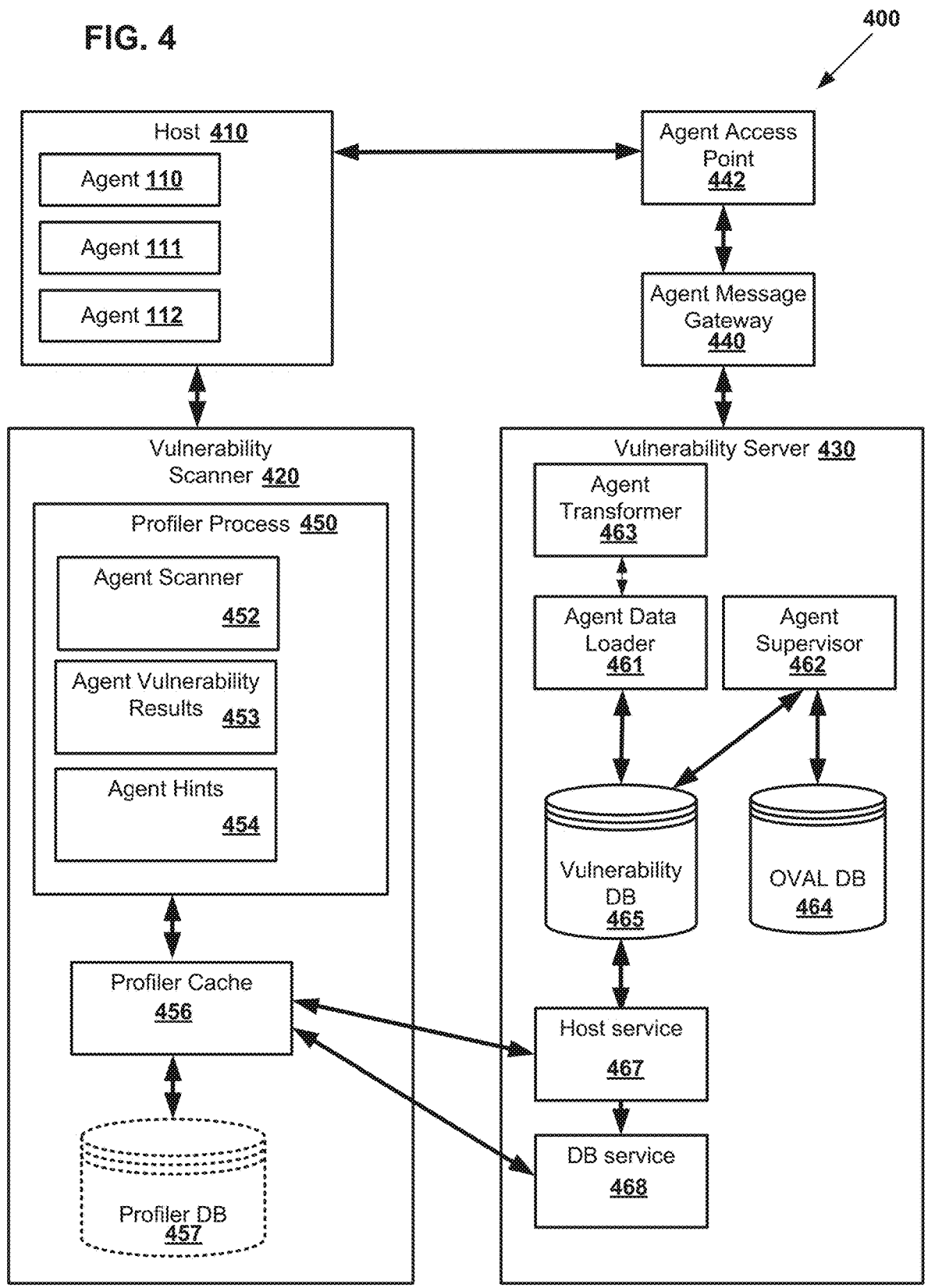
FIG. 4 is a diagram outlining an example system architecture in which certain methods and apparatus disclosed herein can be implemented.

FIG. 4 is a diagram 400 illustrating and outlining an example system architecture in which certain methods and apparatus disclosed herein can be implemented. As shown in FIG. 4, a host 410 is in communication with a vulnerability scanner 420. For example, the host and the vulnerability scanner can communicate via a computer network, or via inter-process communication if both the host and the vulnerability scanner are executed on the same physical server. FIG. 4 further shows a vulnerability server 430 (also dubbed a vulnerability aggregation server) that can receive results from a plurality of hosts and agents. The host can communicate with the vulnerability server via messages sent over an agent message gateway 440. The agent message gateway can receive data from the host in real-time, or data can also be spooled at the host and communicated at a later point in time. The host is configured to send the data via an agent access point 442, which handles protocol encoding/decoding and spooling.

As shown in FIG. 4, the vulnerability scanner 420 includes a profiler process 450 that can host an agent scanner 452, an agent vulnerability result thread or process 453, and an agent hint process 454. The profiler is coupled to a cache situated at the vulnerability scanner. The agent scanner is used to send commands to one or more computing hosts that have agents available. The agent scanner can receive results data generated by executing commands at the host. The results data can be written to a profiler cache 456 using the agent hints thread. The agent scanner can also cause commands to be executed on the host in real-time, without the use of the agents. For example, the profiler 450 can check the profiler cache 456 to see whether a key associated with a vulnerability scan command is available in the cache. If the key is not available in the profiler cache, or the data associated with the key is to old or otherwise invalid, the agent scanner can perform a new scan of the host. If the result associated with the key is valid and present in the cache, then the profiling operations can proceed as if the command had been executed at the host. The profiler cache 456 caches results at the vulnerability scanner 420, but in the event of a cache miss or out-of-data data in the cache, will request new data from the vulnerability server 430 which will be provided from a vulnerability database, as described in further detail below. In some examples, the vulnerability scanner 420 further includes a profiler database 457 that can be implemented as, for example a relational database. In some examples, the profiler database 457 receives requests formed in a standard language such as a Structured Query Language (SQL). In some examples, the profiler database 457 stores vulnerability data expressed in OVAL format. Although OVAL is a desirable format for storing such vulnerability data, in other examples, other data formats or executable code (e.g., Python or scripting languages) can be used to express vulnerability data. In some examples, database technology such as SQL, mySQL, PostgreSQL, or other suitable data technology can be used to implement the profiler database 457.

Also shown in FIG. 4 is a vulnerability server 430. The vulnerability server includes an agent data loader thread or process 461, an agent supervisor thread or process 462, and an agent transformer 463. The agent transformer 463 receives scanning results from the agents and transforms the data to a suitable format for use with the agent data load 461. The agent data loader 461 can read and write data in the vulnerability database 465, including storing formatted results received from the agent transformer 463. The agent supervisor 462 sends data to and from the agents used in configuring and maintaining agents. The agent supervisor 462 performs a number of different tasks, including determining the status of agents running on a plurality of hosts, and sending commands to manage the agents at the plurality of hosts. The agent supervisor can collect commands to send to the agents from the OVAL database 464. The vulnerability server further includes a host service 467 and a database service 468 that can read and write data to and from the profiler cache 456 and the vulnerability database 465.

VI. Further Discussion of Disclosed Agents, Vulnerability Scanners, and Vulnerability Servers FIG. 5 is a diagram 500 further illustrating an example system environment including a vulnerability scanner, vulnerability server, and host executing an agent, as can be implemented in certain examples of the disclosed technology.

Figure 5:
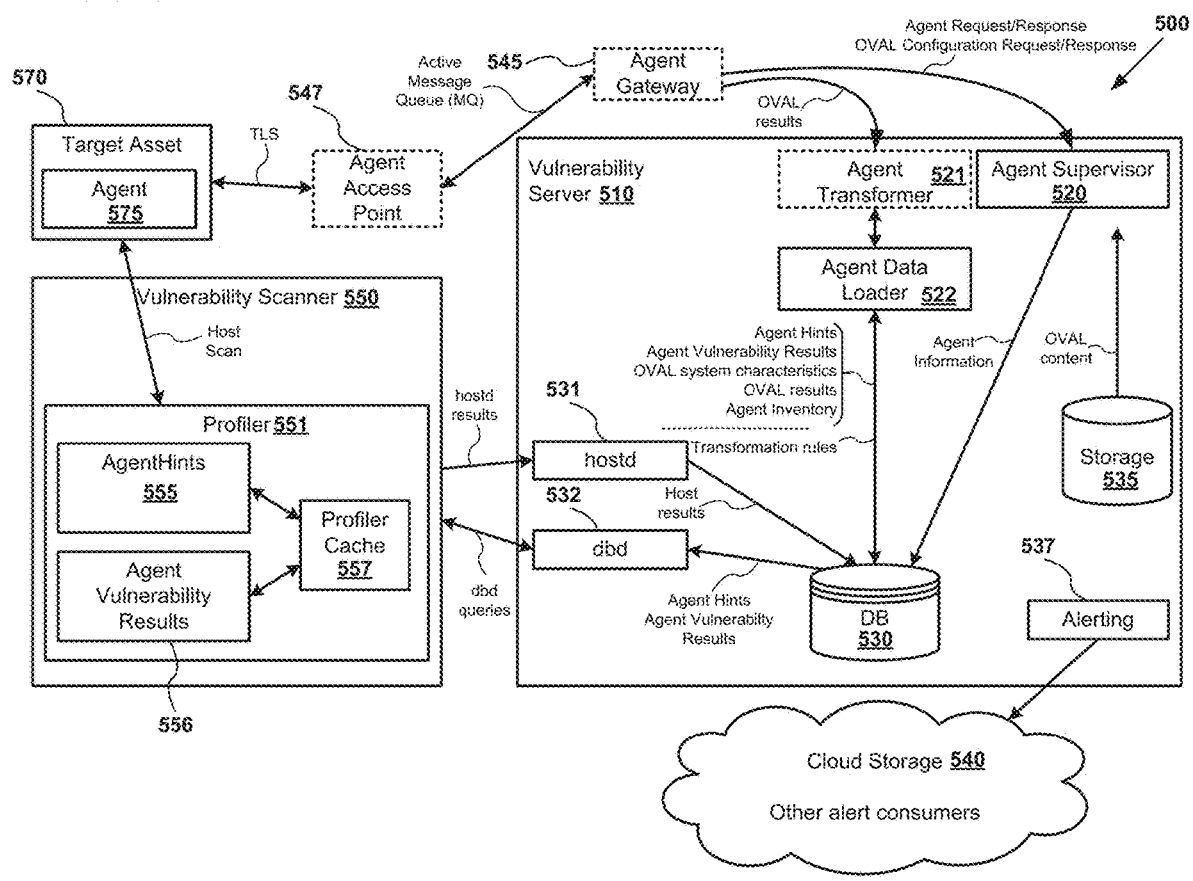
FIG. 5 is a diagram illustrating a system environment including a vulnerability scanner, vulnerability server, and host executing an agent, as can be implemented in certain examples of the disclosed technology.

As shown in FIG. 5, a vulnerability server 510, a vulnerability scanner 550, and a target asset 570 (e.g., a target asset executing an agent) are depicted. The vulnerability server 510 can be implemented using one or more physical or virtual processors in a computing server. The vulnerability server 510 includes a number of software modules, including an agent supervisor 520, which is responsible for supervising agents executing on target assets. In some examples, the agent supervisor 520 sends a schedule to the agents, for example, by sending an OVAL content bundles to the agent. The agent supervisor 520 can also configure scan schedules, requests on-demand scans, and request support log bundles. In some examples, a scanning interval is configured, then sent to the agent as a scan schedule which is followed by the agent. This schedule is persisted and managed by the agent until a new one is sent by agent supervisor 520.

An agent transformer 521 may be used in some implementations in order to transform results received from agents into a consistent form for storage in the vulnerability server database 530. For instance, agents may provide results in different formats, and so using the agent transformer offloads processing of reports for consistency to the vulnerability server 510, and may also allow for the vulnerability server to use reports provided by legacy agents that provide reports in different formats. As one example, the agent transformer 521 can transform the following OVAL system characteristic for a registry key:

```
<win-sc:registry_item id="154" xmlns:win-sc="http://oval.mitre.org/XMLSchema/oval-
systemcharacteristics-5#windows">
    <win-sc:hive datatype="string">HKEY_LOCAL_MACHINE</win-sc:hive>
    <win-sc:key datatype="string">\SOFTWARE\Microsoft\Windows
    NT\CurrentVersion\CurrentVersion</winsc:key>
    <win-sc:value datatype="string">6.0</win-sc:value>
    <win-sc:name xsi:nil="true" xmlns:xsi="http://www.w3.org/2001/XMLSchema-instance" />
    <win-sc:last_write_time datatype="int">128920232195156000</win-sc:last_write_time>
</win-sc:registry_item>
``` into an agent hint key/value pair:

Key: HKLM\SOFTWARE\Microsoft\Windows NT\CurrentVersion\CurrentVersion Value: 6.0

An agent data loader 522 is used to couple agents to the vulnerability server database 530 and can pass messages between the agents and the database. Examples of suitable messages include messages based on data stored in the database 530 including agent hints, agent vulnerability results, OVAL system characteristics, OVAL results, agent inventory, and transformation rules which can be between host agents and the database via the agent data loader 522. The agent supervisor 520 can receive OVAL content stored in one or more storage devices 535 coupled to the vulnerability server 510 that is used to maintain and configure the host agents. Further, the agent supervisor 520 stores agent information in the database 530. One operation performed by the agent supervisor are sending agent request messages, which are broadcast to agent access points, and processing the resulting response messages. Sending the requests can occur on a configurable interval and processing the responses will occur asynchronously as they arrive. When an agent request is sent the agent supervisor 520 will track which known agent access points (e.g., access point 547) have responded. Once all known agent access points have responded, any existing agent records in the agent_agent table that were not updated are marked offline. In a similar fashion, the agent supervisor 520 can send configuration requests to agents and request client data from the agents.

In some examples, the configuration of an agent for vulnerability management is a two-phase process: qualification and configuration. Before an OVAL policy can be sent to an agent the agent supervisor determines which is the correct policy to send. In the first phase, the agent is configured with the pre-qualification content. If the supervisor inventory thread finds the agent to be unqualified, it is queued for processing by the configuration thread. The configuration thread will configure the agent's plugin to run the qualification bundle. This OVAL configuration will be run on a schedule so that changes, like OS upgrades or service pack installations, will be accounted for soon after they happen. Unlike the regular OVAL content, the results will be returned to the agent supervisor 520 rather than the agent data loader 522. If this cannot be accomplished directly, the Agent Transformer will be updated to ignore the qualification results. The inventory thread also assesses a qualified agent against its OVAL configuration.

The second phase occurs once an agent is recorded and qualified. Using the results of the qualification and the contents of an agent configuration identifier, the inventory thread can determine whether the agent should be re-queued for update by a configuration thread. For example, If the agent identifier string does not match the config value for the current ASPL and schedule, the agent is added to a task queue for updating. Alternatively, the agent identifier could include a bundle ID for a policy that no longer applies because of a service pack update.

The vulnerability server 510 further includes an alerting module 537, that can be used to send alerts for logging or analysis to servers in a computing cloud 540, or to send data to other consumers of vulnerability alerts, for example an administrative interface used to identify and respond to vulnerabilities detected in one or more of the target hosts.

In some examples of the disclosed technology, the vulnerability server 510 communicates directly with the target asset 570 host in the agent 575. In other examples, a messaging service is used including for example, an agent gateway 545 and an agent access point 547. The gateway and access points are optional to some implementations. The access point 547 receives and sends messages to the agent 575. For example, the access point 547 can be configured to receive and send data to and from a large plurality of target hosts in a network. It can use various identification techniques in order to track and select the right agent on the network for sending and receiving messages to and from. The agent gateway 545 can be used to access networks outside the local-area network that the target assets 570 are communicating on. The agent gateway 545 or the agent access point 547 can include a message queue that is used to temporarily store messages to be received from or sent to the target asset 570, prioritize messages, and control message volume, for example, by stalling messages or deleting low priority messages when bandwidth is scarce or the number connection is temporarily inactive.

The vulnerability scanner 550 can use data collected from agents running on the hosts 570 there are also scanned remotely by the vulnerability scanner. Being able to use agent data as well as scan data can provide speed, efficiency, and/or flexibility in using the vulnerability scanner 550. Further, agent plugins can allow for modular configuration and operation of the agents 575. The vulnerability scanner 550 scans can be augmented with agent data by augmenting date of the rules are run against, agent hints, and by augmenting the eventual result of performing such rules, agent vulnerability results. These two techniques can be used independently but also in a complementary fashion. In some examples of the disclosed technology, only one of these techniques is implemented.

Vulnerability scanner scans performed using agent hints can be improved by using data gathered by agents during agent-based scans. This can increase scanning productivity and reduce the use of credentialed access. Agent-less scans executed by the vulnerability scanner 550 can use a caching mechanism that uses hints. A hints cache is maintained for each context that is scanned, for example, each protocol/port pair. Each unique request and response can be cached in the profiler cache so that subsequent rules that use the same scan data can get it from the cache instead of making an additional request to the target asset 570. Data received from the agent can be used to pre-populate the cache, removing the use of an initial scanning request.

The vulnerability scanner 550 can be provided with a unique agent identifier for each agent 575. This agent identifier is used to populate the agent hints module 555 and the agent profiler cache 556. The vulnerability scanner can inquire the vulnerability server 510 in order to associate and agent identifier with a network address (e.g., an Internet protocol (IP) address).

The vulnerability scanner 550 can be implemented using one or more processors and includes a profiler module 551 that manages sending vulnerability data, performing external profiler scans of hosts, and receiving results from the agents. As shown, the scanner includes an agent hints module 555, an agent vulnerability results model 556, and a profiler cache 557. The cache 557 is used to map agent hints to commands that will be executed on the target asset when performing scans. The agent vulnerability results are received from the target asset 570 and can be stored in the profiler cache. In some examples, the profiler cache 557 is indexed by the command or commands used to generate a vulnerability results are used as the key of a key value pair, and the result of a previous execution of the commander commands is the value of the key value pair stored in the cache. In some examples, hints are manually populated, while in other examples, hints for a host can be retrieved from the vulnerability server 510.

The profiler 551 communicates with the host daemon and the database daemon at the vulnerability server 510 to implement methods of vulnerability scanning described herein. For example, some vulnerability scans may be performed by the agent 575 executing at the target asset 570. In some examples, when vulnerability scans cannot be performed by the agent 575, the vulnerability scanner 550 implements the scan. In some examples, the vulnerability scanner searches for data associated with the vulnerability test to determine whether the first data associated with the vulnerability is available or not available. When the data is available in the profiler cache 557, the vulnerability scanner 550 skipped scanning of the target asset 570 and instead provides result data from the profiler cache 557 to the vulnerability server 510. On the other hand, when data associated with the vulnerability test is not available in the vulnerability scanner database, example, because the device scan has not been run, or is out of date, or the agent at the target asset 570 cannot be reached or is otherwise unavailable, the vulnerability scanner performs a scan of the host to obtain data associated with the vulnerability test. This data from performing the scan can be stored in the profiler cache 557 and provided to the vulnerability server 510 responsive to requests for host results. Thus, the load on target assets by performing scans either using in the agent, or with the vulnerability scanner can be reduced. When the vulnerability server 510 collects data produced by scans and by agents executed on host, the vulnerability server acts as a vulnerability aggregation server.

In some examples, the system characteristics used to populate the cache database can include, but are not limited to, registry entries, object attribute metadata, including file attribute metadata (e.g., file versions, creation/modification dates, file size), object content metadata (e.g., hash-based signatures such as MD5 or SHA-1 for all or a portion of an object, or YARA descriptions or rules) or other objects at the target asset generated by the agent or by the scan. In some examples, execution results generated by executing the commands can be encoded within an OVAL file. In some examples, the scan can be performed during a time when the vulnerability server 510 or the vulnerability scanner 550 do not have an active network connection to the host. In some examples, the vulnerability scanner can send a prequalifier indicator that indicates a prequalifier condition associated with a vulnerability test to the target asset 570. The target asset can compare configuration aspect of the host to the prequalifier conditional, and determine whether to perform a scan based on this comparing. For example, the prequalifier can be a version of an operating system or application, and the host can skip a scan if the prerequisite version not available at the target asset 570. For example, vulnerabilities can be associated with specific versions of host operating systems or applications. In some examples, the vulnerability scanner 550 searches for data by using the description of the vulnerability test as a search key. In some examples, the vulnerability scanner performs a scan by executing operations that are specified by the search key. In some examples, the vulnerability scanner provides a search key to the agent for executing commands specified by the search key.

The vulnerability server can further provide modules, daemons, services, or other threads or processes for communicating to the vulnerability scanner 550. As shown, the vulnerability server 510 is hosting a host daemon 531 that receives results from the vulnerability scanner 550 and sends them to the vulnerability server database 530 for storage. The vulnerability server 510 also hosts a database daemon 532 that retrieve data from the vulnerability server database 530 and sends the data to the vulnerability scanner 550 responsive to queries from the vulnerability scanner.

Figure 6:
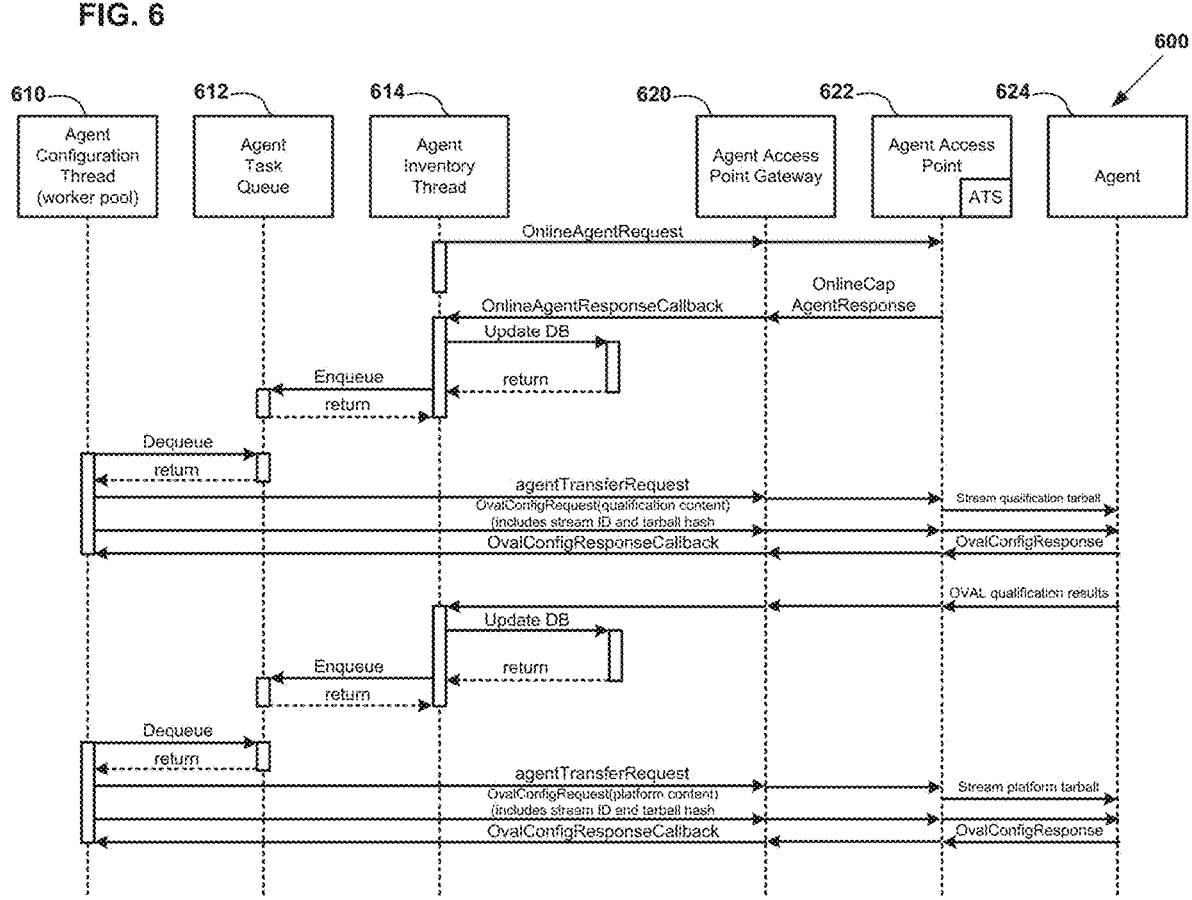
FIG. 6 is a process diagram illustrating of communication that can occur between an agent, and agent access point, and an agent access point gateway, as can be performed in certain examples of the disclosed technology.

FIG. 6 is a process diagram 600 illustrating an example of communication that can occur between a vulnerability server, an agent, an agent access point, and an agent access point gateway, as can be performed in certain examples of the disclosed technology. For example, the vulnerability server can use its agent supervisor 520, agent transformer, and/or agent data loader 522 modules to control maintenance and configuration operations performed at the agents.

In the illustrated process diagram, the vulnerability server 510 hosts an agent configuration thread 610, an agent task queue 612, and agent inventory thread 614. The vulnerability server queue to case with the agent 624 via the agent access point gateway 620 and agent access point 622.

In the illustrated example, the process begins by the agent inventory thread 614 sending an online agent request to the agent access point 622. An online agent response message is sent to the agent access point gateway 620, which in turn sends an online agent response call back to the agent inventory thread 614. The agent inventory thread 614 updates the database 530 with information received in the agent response. Operations to be performed by the agent are sent by the agent inventory thread 614 to the agent task queue 612, which in response sends a command to the agent configuration thread 610, which in turn initiates an agent transfer request, which sends an agent transfer request message to the agent 624. This agent transfer request includes prequalification data that is used by the agent 624 to determine whether various scans initiated by the vulnerability server are applicable to the particular agent at this particular host. The agent then sends OVAL qualification results back to the vulnerability server, and the agent inventory thread 614 updates that database 530. The agent configuration thread 610 then sends a second agent transfer request to the agent that includes applicable vulnerability scanning data, based on their prequalification response sent by the agent in the first response. Data can be collected and compressed to reduce network load, for example by sending a number of files collected as an archive, which can be compressed using gzip or other appropriate compression software. For example, vulnerability definitions and rules can be contained in the archive, which may be produced as a gzip-compressed tar archive.

Before an agent is configured to run a platform-specific policy, the platform may be determined. One flexible way is to actually run an OVAL policy to determine the platform. Included in the OVAL content is a special prequalification content bundle. This content is a set of platform checks where the OVAL definition IDs correspond to the OVAL bundle platform IDs. When this content is executed whichever platform matches is recorded for the agent and used for subsequent configuration. By placing both policy creation and platform determination under vulnerability server control, new platforms can be added or platforms can be changed without needing any vulnerability scanner changes.

For each distinct platform version, such as Linux CentOS 6 or RHEL 7, the policy bundle can be provided as a tar file or other archive, which includes an OVAL definition eXtensible Markup Language (XML) file. The OVAL definition is executed by the agent with all results returned together. To reduce load, the agent may be configured to return minimal results, being the OVAL definition ID and the result value (pass, fail, error, etc.). XML need not be returned because this can generate an overwhelming amount of data to transfer and process. In some examples, both positive and negative results are returned.

For each platform, the policy bundle can be an OVAL definition file designed so that OVAL system characteristics can be used in the agent hints cache. The agent is configured to return full results so that the system characteristics XML is included.

Figure 7:
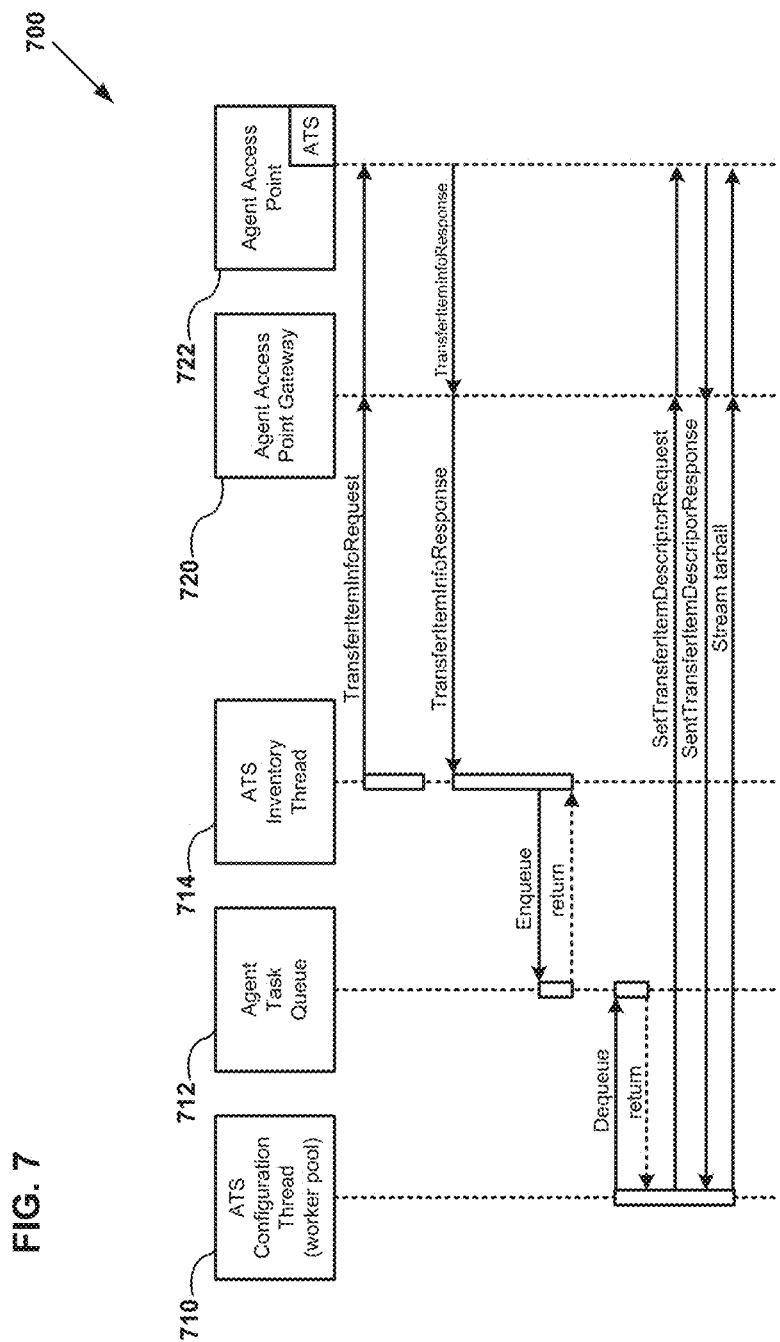
FIG. 7 is a process diagram illustrating communication that can occur when using an agent access point, as can be performed in certain examples of the disclosed technology.

FIG. 7 is a process diagram 700 illustrating an example of communication that can occur when using an agent access point, as can be performed in certain examples of the disclosed technology. As shown, the agent transfer service inventory thread 714 sends a transfer item information request to the agent access point 722 via an agent access point gateway 720. The agent access point 722 sends a transfer item in response via the gateway to the inventory thread 714. The agent task queue 712 queues the task for performance by the agent configuration thread 710. The configuration thread 710 retrieves the task from the queue and sends a transfer item descriptor request to the agent access point, responses received in return, and then an archive collecting data responsive to the request and response are sent to the agent access point.

VII. Example Schemas and Other Details of an Example Agent-Based Vulnerability Management System Further details regarding example schemas and other details for implementing a particular example of an agent-based vulnerability management system are described below. As will be readily understood to one of ordinary skill in the relevant are having the benefit of the present disclosure, variations in the illustrated schemas and other aspects can be adapted to other examples of the disclosed technology.

Figure 8:
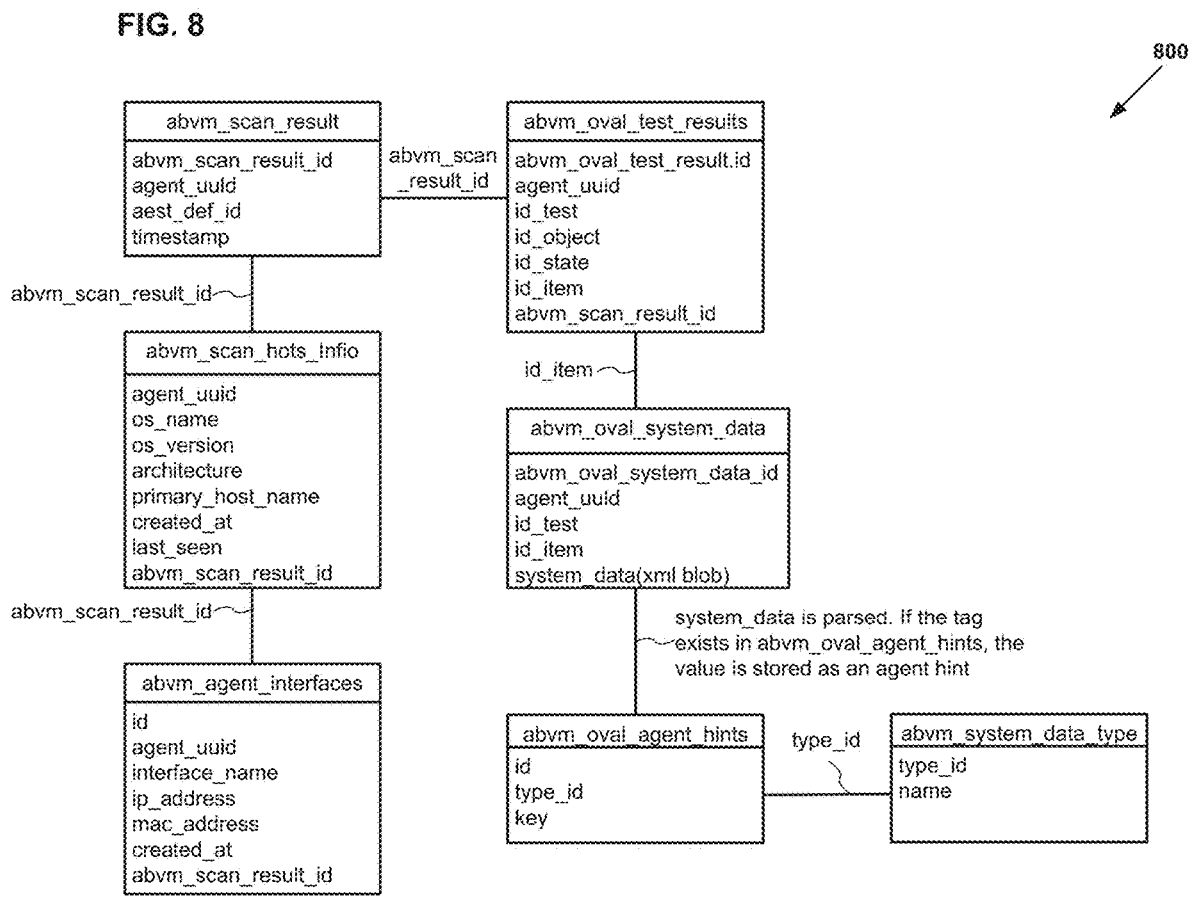
FIG. 8 is a diagram that depicts data objects that can be used to perform agent-based vulnerability management in certain examples of the disclosed technology.

FIG. 8 is a diagram 800 that depicts an example of a data object schema that can be used to perform agent-based vulnerability management in certain examples of the disclosed technology. In the illustrated schema, hints are saved by comparing tags stored in the table abvm_OVAL_system_data against the keys stored in the table abvm_OVAL_agent_hints. If the tag exists, the value will be saved as an agent hint. As shown, other schema elements are used to define storage for scan results, host information, agent interfaces, test results, and other defined data tables.

Figure 9A:
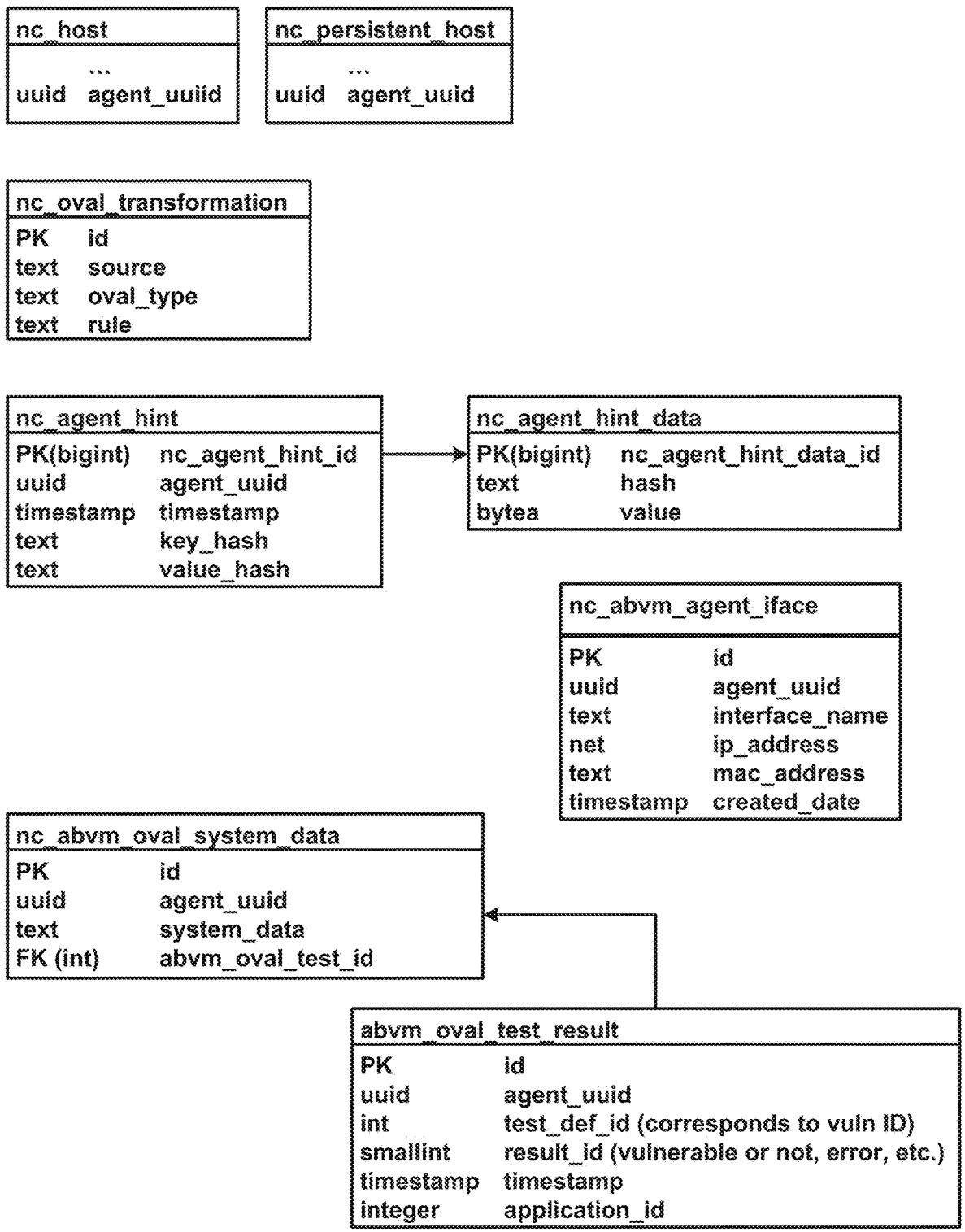
FIGS. 9A-9C illustrate a diagram that depicts data objects that can be used to perform agent-based vulnerability management in certain examples of the disclosed technology.
Figure 9B:
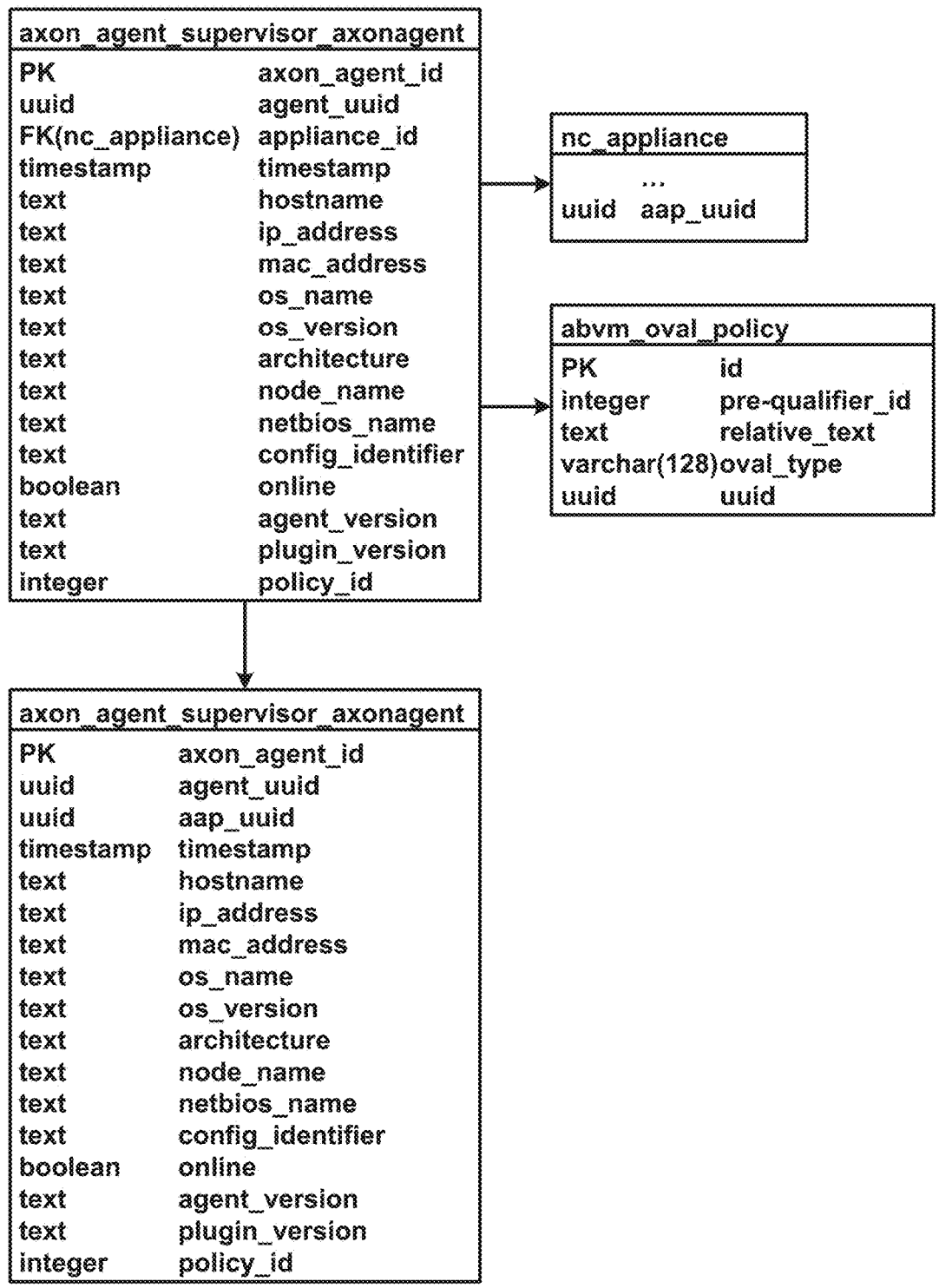
Figure 9C:

FIGS. 9A-9C illustrate a diagram 900, 901, 902 that depicts an example of a data object schema that can be used to perform agent-based vulnerability management in certain examples of the disclosed technology. In the illustrated schema, host and persistent host information are stored in the illustrated tables. The nc_OVAL_transformation table includes a set of rules to transform OVAL system characteristics into agent hint key/value pairs. In some examples, data is extracted from, for example, XML fields. In other examples, more sophisticated transformations may be used. For example, a registry item can have its hint abbreviated and concatenated with the registry key name. In some examples, the key can be an n-tuple, for example, a 5-tuple comprising query type, user, password, key, case in sensitivity. The source field can be used to identify which rules are shipped from the vulnerability scanner, and which are shipped as part of the content, thereby allowing both rules to coexist. An agent hint table can store a key/value pair that is sent to the data profiler for use in augmenting scans as described in further detail herein. The scan result table contains a record of the OVAL scan that was run by an agent. The scan host information table return system information discovered during an OVAL scan. The agent interface table describes any network interface information discovered using an OVAL scan. The OVAL test result table stored as a result of each individual OVAL test run by an agent.

A. Example ABVM Agent Groups

In some examples, settings for agents can be applied to all agents in a system. Agents can also be grouped by creating a network/agent through-table, creating a representational state transfer (REST) application programming interface (API) for agent networks, adding a user interface for agent networks, and/or providing a system for automatically grouping agents.

For example, a network/agent through-table can be created by using nc_network to create networks which are network_type='agent' just like the system network. This will define the agent group.

The nc_network_range table can be used to define ranges for normal scans, and thus create a new table that defines the agents for this new network type.

B. Create REST API for Agent Networks

A new API endpoint can be created that lets the agent supervisor control these new agent groups. An example JSON (JavaScript object notation) file for a REST API can be expressed as shown in Table 1 below:

TABLE 1

```
{
    "url": "/rest/v1/axon/agent_groups/1",
    "name": "something",
    "active": true,
    "owner": "/rest/v1/users/1",
    "notes": "",
    "system": false,
    "asset_value": 5,
    "favor_netbios_name": true,
    "match_priority": 10,
    "agents": [
        "/rest/v1/axon/agent/1",
        "/rest/v1/axon/agent/2"
    ]
}
```

C. Adding User Interface for Agent Networks

In some examples, the system can provide a user interface (or a voice interface) that displays the new agent groups and lets users manually put agents into a group. This allows customers to manually fix groups as desired. The system can change the scan wizard to only allow selecting an agent network when an agent-only scan profile is selected.

D. System for Automatically Grouping Agents

In some examples, the system can automatically group agents. This will happen when a new agent is discovered, or if an administrator manually runs the created rules on a group (or on all non-grouped agents).

In some examples, this can be performed using a regular expression created for certain fields and grouped if matched. For example, a rule can be created for the "os_name" column in the table with a regex of "(windows|microsoft)" and then in Django the existing regex/iregex filters used to filter the columns securely. This allows for customization without resorting to lua scripts or other complications.

Further, using the "match_priority" column an administrator can control which group it should use if multiple fields are matched. This allows putting all fields for a specific version of an operating system into one group, and all other versions of the operating system into a catch-all group. To accomplish this, the table illustrated in Table 2 can be used:

TABLE 2

| nc_network_agent_matching | |
|---|---|
| id | primary agent (bigint) |
| column_name | column from a supported list of agent supervisor tables |
| regex_string | string to run the regular expression on |
| network_id | FK to nc_network, if a match this defines what group to put the agent in. |

A REST API can be used as well as a user interface and the ability to run the rules on existing agent groups (or all ungrouped agents). The supervisor can run the match rules when a new agent is added, and a system setting to turn that on and off in case the administrator wants to manually control it.

VIII. Example Method of Using a Vulnerability Scanner

Figure 10:
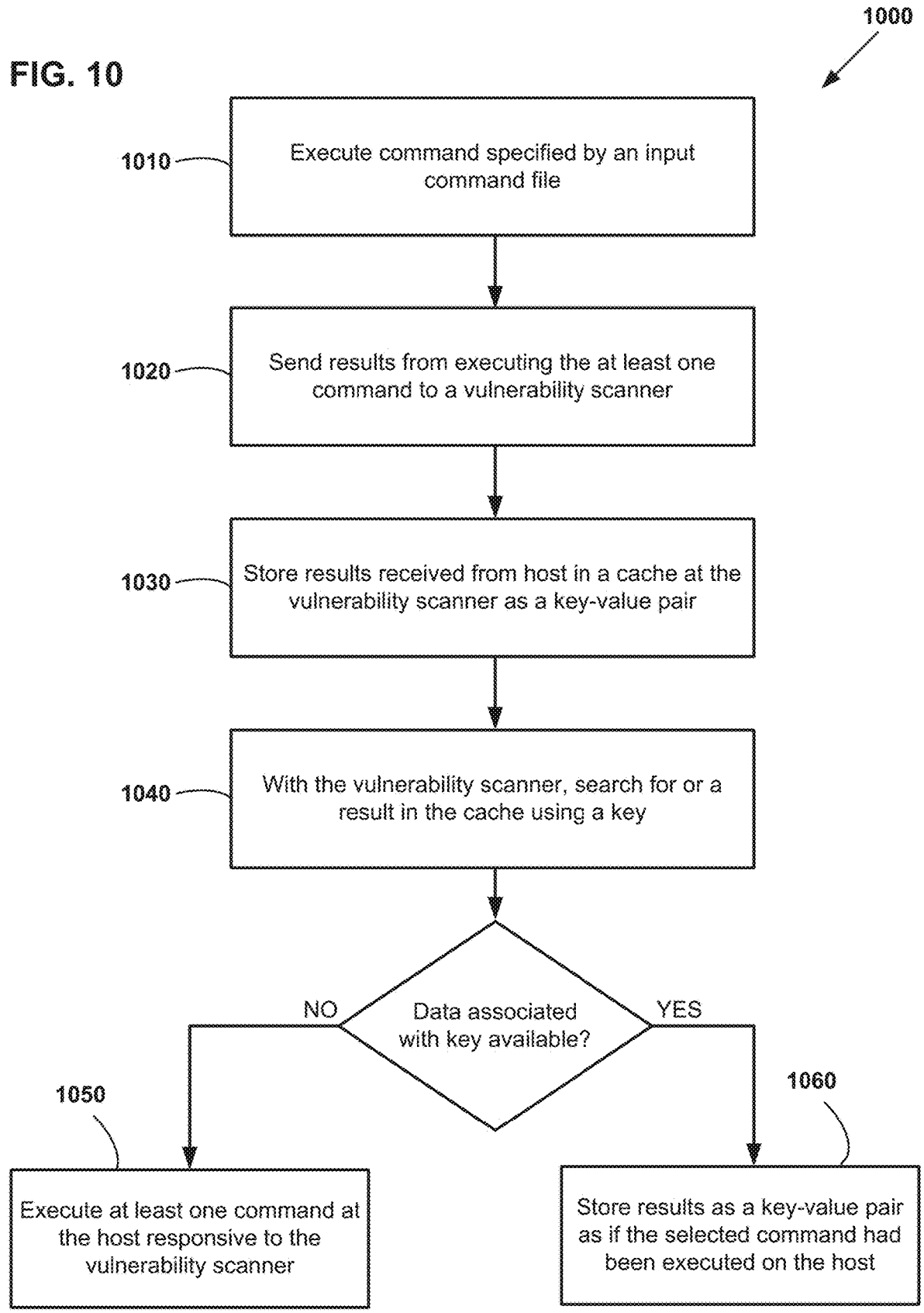
FIG. 10 is a flowchart outlining an example method of using a vulnerability scanner, according to the disclosed technology.

FIG. 10 is a flowchart 1000 outlining an example method of using a vulnerability scanner, according to certain aspects of the disclosed technology. For example, the vulnerability scanner examples discussed above can be used to implement the illustrated method.

At process block 1010, a host executes at least one command specified by an input command file. For example, an agent process configured to execute on the host can execute the specified command.

At process block 1020, the host can send results from executing the at least one command to a vulnerability scanner. For example, the result can be sent as a key-value pair, where the key indicates the specified command, and the value indicates the results of executing the at least one command.

At process block 1030, the vulnerability scanner stores results received from the host and a cache at the vulnerability scanner as a key-value pair. At least one of the commands is used to generate the key of the pair, and at least a portion of the results are used as the value of the key-value pair.

At process block 1040, the vulnerability scanner searches for result in the cache using a key. When data associated with the key is not available, or is determined to be invalid, the method proceeds to process block 1050. When the data associated with the key is available, the method proceeds to process block 1060.

At process block 1050, the vulnerability scanner causes the host execute the least one command. For example, the vulnerability scanner can access the host by tunneling, for example, using a Secure Shell (SSH) tunnel and executing the specified command on the host. Results obtained from executing the command in real-time are returned as the results of the selected scan.

At process block 1060, results stored as the key-value pair are returned as if the selected command associated with the key had been executed on the host. Thus, commands that have been stored in the vulnerability scanner cache can be used instead of performing commands at the host using, for example, a tunnel to access the host.

In some examples, the method further includes sending a pre-qualifier description to the host. The pre-qualifier can be expressed in an OVAL format. The host executes commands associated with the pre-qualifier, for example, identifying the system type or operating system installed on the host. This data can be used by the vulnerability scanner to select a set of commands to run selected based on the particular system type or operating system specified by performing the pre-qualifier test.

IX. Example Method of Using a Vulnerability Scanner

Figure 11:
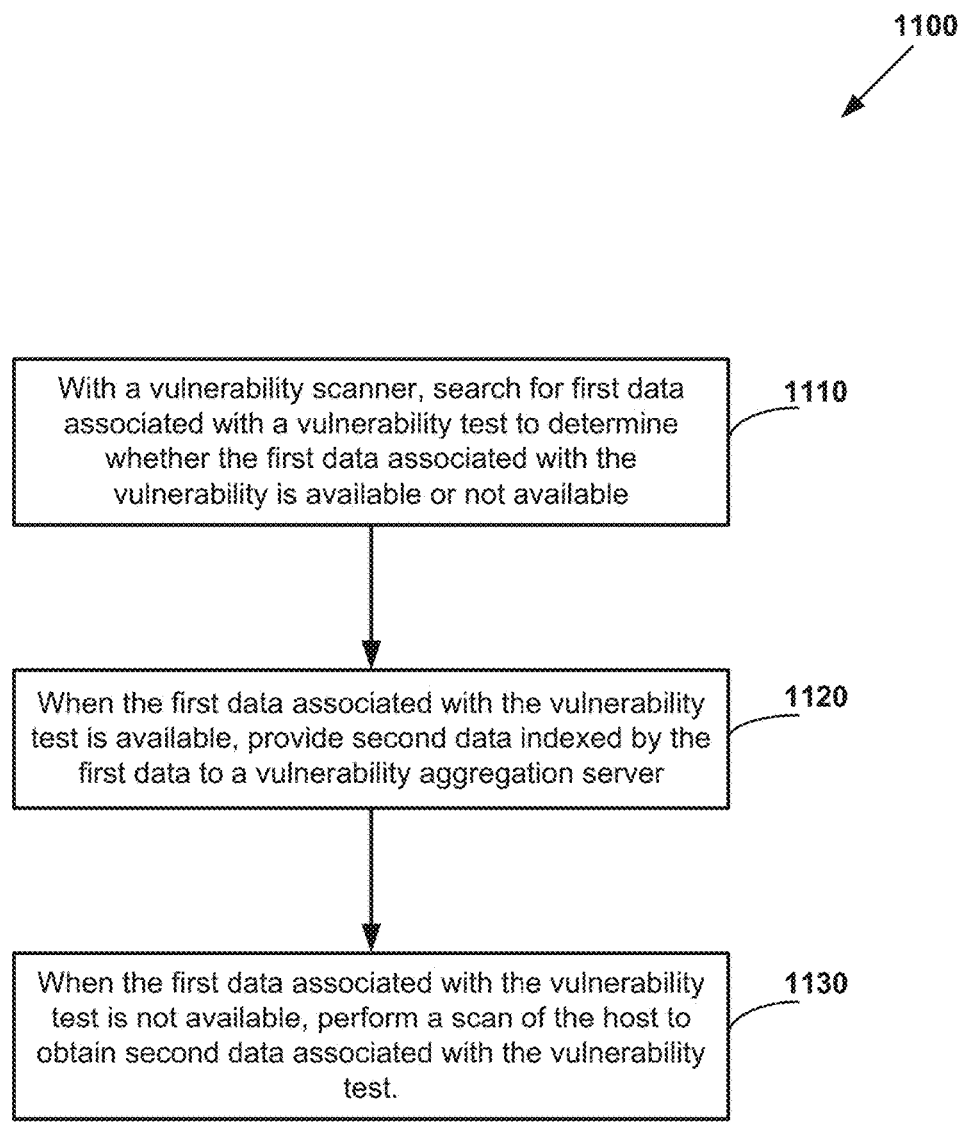
FIG. 11 is a flowchart outlining an example method of scanning a host to obtain data associated with a vulnerability test.

FIG. 11 is a flowchart 1100 outlining an example method of using a vulnerability scanner, according to certain aspects of the disclosed technology. For example, the vulnerability scanner apparatus disclosed herein can be used to implement the illustrated method.

At process block 1110, the vulnerability scanner is used to search the cache for first data associated with vulnerability test to determine whether the first data is available are not available in the vulnerability scanner cache. For example, a key value pair where the key is the command used to scan and agent can be searched for in the profiler cache. If the first data is available in the profiler cache, the method proceeds to process block 1120 and the value associated with the first data is provided to a vulnerability aggregation server. In this instance, performing an additional scan of the agent can be avoided and results (second data) from a previous scan provided instead. If the first data is not available in the vulnerability scanner cache, the method proceeds to process block 1130 and a scanning of the host is performed to obtain second data associated with a vulnerability test. After the scan completes, resulting values from the scan are written to the cache and sent to the vulnerability aggregation server for storage in the vulnerability database.

X. Example Method of Using a System Characteristics File

Figure 12:
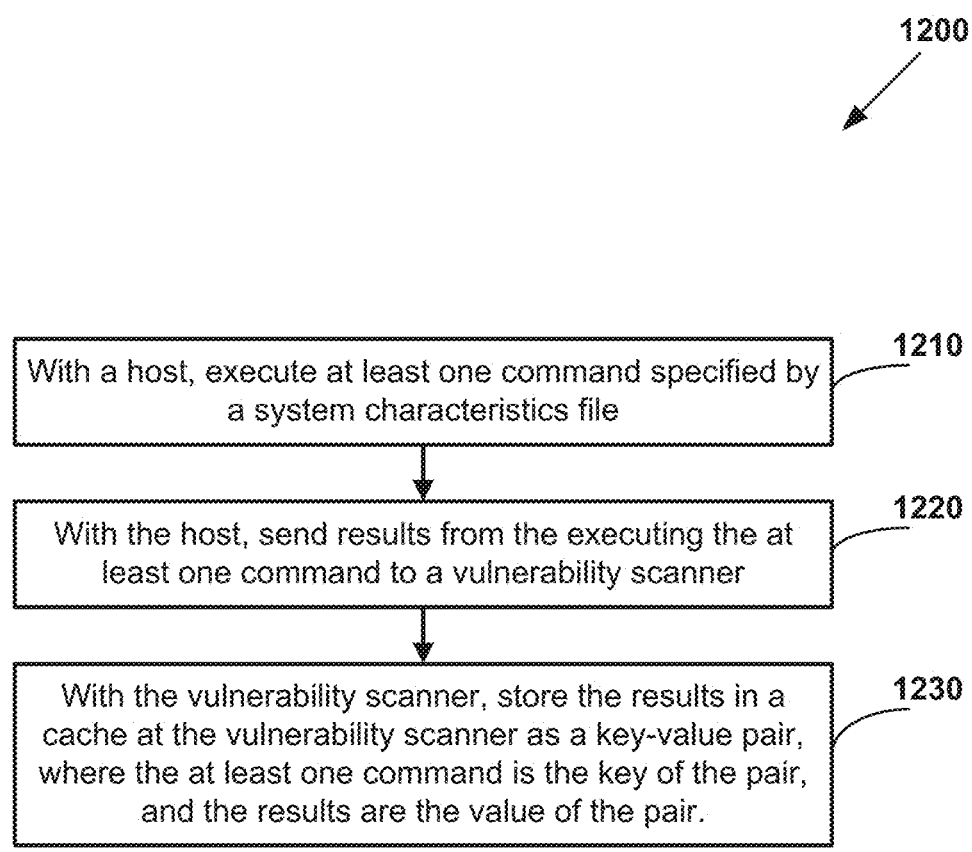
FIG. 12 is a flowchart outlining a method of using a vulnerability scanner cache, as can be performed in certain examples of the disclosed technology.

FIG. 12 is a flowchart 1200 outlining an example method of using an input command file, as can be implemented in certain examples of the disclosed technology. The input command file is stored at an agent's host computer. The input command file specifies operations that can be executed by the host to produce vulnerability scan results. In some examples, the input command file is an OVAL definition file that can be used to produce an OVAL system characteristics file. In some examples, the input command file includes shell commands, registry queries, and/or file attribute queries performed on the host.

At process block 1210, the host executes at least one command specified in the input command file. For example, shell commands or other system commands can be specified in the file and then executed. The commands are selected to generate data that will indicate whether a vulnerability exists on the host computer.

At process block 1220, the host sends results including system characteristics generated from executing the command to a vulnerability scanner. The vulnerability scanner can be implemented using systems described above regarding other vulnerability scanner examples.

At process block 1230, vulnerability scanner stores the results generated by the host in a cache at the vulnerability scanner as a key-value pair. The command used to generate the result is the key of the pair, and the results generated by the command are the value of the pair. The key is used to index the profiler cache such that future requests to obtain vulnerability data can be produced from the profiler cache instead of re-executing a scan on the host. In some examples, the vulnerability scanner additionally includes a local profiler database.

XI. Example Computing Environment

Figure 13:
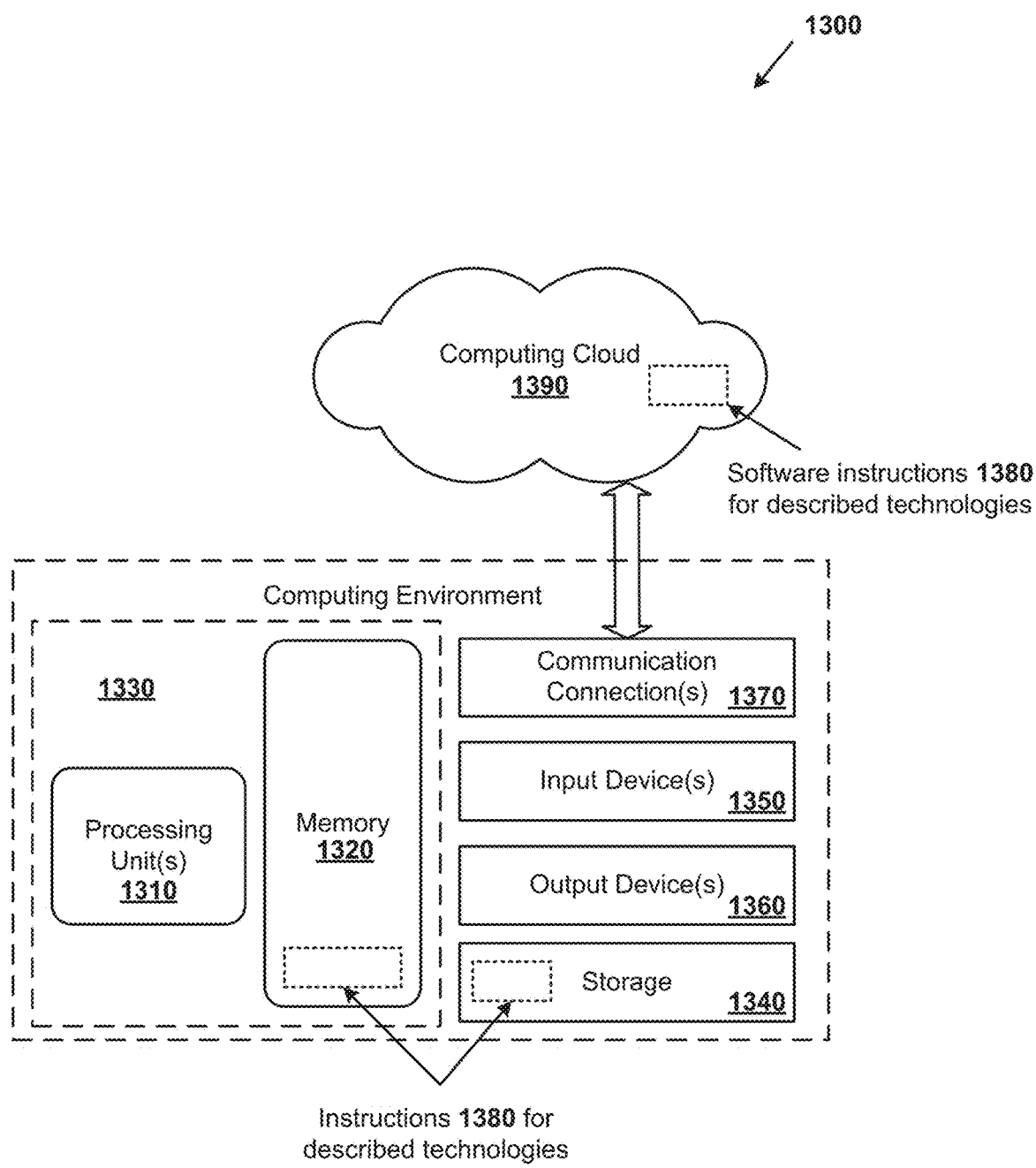
FIG. 13 is a diagram outlining an example computing environment in which certain examples of the disclosed technology can be implemented.

FIG. 13 illustrates a generalized example of a suitable computing environment 1300 in which described embodiments, techniques, and technologies, including reporting agents and monitor servers, can be implemented. For example, the computing environment 1300 can implement any of the agents, vulnerability scanner agent platform servers, and destination agent data consumers, as described herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one central processing unit 1310 and memory 1320. In FIG. 13, this most basic configuration 1330 is included within a dashed line. The central processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and destination agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, agents can be executing vulnerability scanning functions in the computing environment while agent platform (e.g., bridge) and destination agent data consumer service can be performed on servers located in the computing cloud 1390.

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals or transitory signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

The invention claimed is:

1. A method comprising:
by a vulnerability scanner, sending a prequalifier indicator indicating a prequalifier conditional associated with a vulnerability test to a host;
by the host, comparing a configuration aspect of the host to the prequalifier conditional; and
in response to the comparing indicating that the configuration aspect is suitable for the prequalifier condition:
by the vulnerability scanner, searching for first data associated with the vulnerability test performed by an agent executing on the host to determine whether the first data associated with the vulnerability is available or not available;
when the first data associated with the vulnerability test is available in a vulnerability scanner database, providing second data generated by vulnerability test operations specified by the first data to a vulnerability aggregation server; and
when the first data associated with the vulnerability test is not available in the vulnerability scanner database, performing a scan of the host to obtain second data associated with the vulnerability test.

2. The method of claim 1, further comprising:
by the vulnerability scanner, receiving first data from a host comprising data generated by performing a vulnerability test on the host with an agent and storing the first data in a vulnerability scanner database.

3. The method of claim 1, further comprising:
by the vulnerability scanner, sending the first data or the second data to a vulnerability aggregation server.

4. The method of claim 1, wherein the first data comprises commands and the second data comprises system characteristics.

5. The method of claim 1, wherein the first data comprises execution results generated by executing at least one command encoded within an OVAL file.

6. The method of claim 1, further comprising performing the scan during a time period when the vulnerability server does not have an active network connection to the host.

7. The method of claim 1, wherein the prequalifier conditional indicates an operating system, an operating system version, an application, or an application version installed on the host.

8. The method of claim 1, further comprising:
searching for the data by using a description of the vulnerability test as a search key.

9. The method of claim 8, further comprising:
performing the scan by executing operations specified by the search key.

10. The method of claim 8, further comprising:
providing the search key to the agent for executing the search key.

11. A non-transitory computer-readable storage media storing computer-executable instructions, which when executed, cause a computer to perform a method, the instructions comprising:
instructions that cause the computer to sending a prequalifier indicator indicating a prequalifier conditional associated with a vulnerability test to a host; and
in response to a comparison of the prequalifier conditional and a configuration aspect of the host by the host indicating that the configuration aspect is suitable for the prequalifier condition:
instructions that cause the computer to invoke a database search for first data associated with a vulnerability test to determine whether the first data precludes scanning a host;
when the first data associated with the vulnerability test is available in a vulnerability scanner database, providing the first data to a vulnerability aggregation server; and
when the first data associated with the vulnerability test is not available in the vulnerability scanner database, performing a scan of the host to obtain second data associated with the vulnerability test.

12. The non-transitory computer-readable storage media of claim 11, wherein the first data comprises a registry entry or file attribute.

13. The non-transitory computer-readable storage media of claim 11, wherein the first data comprises a description of the vulnerability test comprising an instruction executed by the host as part of the performing the scan.

14. The non-transitory computer-readable storage media of claim 11, wherein the first data or the second data comprise OVAL data.

15. An apparatus, comprising:
at least one processor; memory; and
a non-transitory computer-readable storage media storing computer-executable instructions, which when executed, cause a computer to perform a method, the instructions comprising:
instructions that cause the computer to sending a prequalifier indicator indicating a prequalifier conditional associated with a vulnerability test to a host; and
in response to a comparison of the prequalifier conditional and a configuration aspect of the host by the host indicating that the configuration aspect is suitable for the prequalifier condition:
instructions that cause the computer to invoke a database search for first data associated with a vulnerability test to determine whether the first data precludes scanning a host;
when the first data associated with the vulnerability test is available in a vulnerability scanner database, providing the first data to a vulnerability aggregation server; and
when the first data associated with the vulnerability test is not available in the vulnerability scanner database, performing a scan of the host to obtain second data associated with the vulnerability test.

16. A method comprising:
by a host, receiving a prequalifier indicator indicating a prequalifier conditional associated with a vulnerability test from a vulnerability scanner;
by the host, comparing a configuration aspect of the host to the prequalifier conditional; and
in response to the comparing indicating that the configuration aspect is suitable for the prequalifier condition:
by the host, executing at least one command specified by an input command file; and
by the host, sending results from the executing the at least one command to a vulnerability scanner to store the results in a cache at the vulnerability scanner as a key-value pair, wherein the at least one command is the key of the pair, and the results are the value of the pair.

17. The method of claim 16, further comprising, by the vulnerability scanner:
   searching for a result in the cache using a key; and
   when data associated with the key is not available or is determined to be invalid, causing the host to execute the at least one command.

18. The method of claim 17, wherein the host executes the at least one command when the host does not have an active network connection to the vulnerability scanner.

19. The method of claim 16, further comprising, by the vulnerability scanner, and responsive to receiving the results from the host:
   storing the results in the cache at the vulnerability scanner; sending a prequalifier description to the host;
   receiving from the host a description of the host; and
   based on the description, selecting the at least one command to be sent to the host.

20. The method of claim 16, wherein the key specifies a vulnerability test expressed using OVAL.

* * * * *